(12) United States Patent
Joshi et al.

(10) Patent No.: US 7,432,321 B2
(45) Date of Patent: Oct. 7, 2008

(54) SILICA-RUBBER MIXTURES HAVING IMPROVED HARDNESS

(75) Inventors: Prashant G. Joshi, Ossining, NY (US); Antonio Chaves, Chappaqua, NY (US); Lesley Hwang, White Plains, NY (US); Michael Stout, Brookfield, CT (US); Martin Hofstetter, Bellrose Manor, NY (US); Louis M. Panzer, Ridgefield, CT (US)

(73) Assignee: Momentive Performance Materials Inc., Wilton, CT (US)

( * ) Notice: Subject to any disclaimer, the term of this patent is extended or adjusted under 35 U.S.C. 154(b) by 0 days.

(21) Appl. No.: 10/617,165

(22) Filed: Jul. 8, 2003

(65) Prior Publication Data
US 2005/0277717 A1 Dec. 15, 2005

Related U.S. Application Data

(60) Provisional application No. 60/451,449, filed on Mar. 3, 2003, provisional application No. 60/394,264, filed on Jul. 9, 2002.

(51) Int. Cl.
C08K 3/34 (2006.01)
(52) U.S. Cl. ........................ 524/492; 524/493
(58) Field of Classification Search ......... 524/261–263, 524/492, 493
See application file for complete search history.

(56) References Cited

U.S. PATENT DOCUMENTS

| | | | |
|---|---|---|---|
| 3,502,704 A | 3/1970 | McKellar | 260/448.8 |
| 3,692,812 A | 9/1972 | Berger | 260/448.2 |
| 3,798,196 A | 3/1974 | Rocktaschel et al. | |
| 3,869,340 A | 3/1975 | Kotzsch et al. | |
| 3,922,436 A | 11/1975 | Bell et al. | 428/375 |
| 3,957,718 A | 5/1976 | Pochert et al. | 260/38 |
| 4,060,539 A | 11/1977 | Seiler et al. | 260/448.8 |
| 4,152,347 A | 5/1979 | Pletka et al. | |
| 4,184,998 A | 1/1980 | Shippy et al. | 260/42.15 |
| 4,519,430 A | 5/1985 | Ahmad et al. | 152/209 |
| 4,574,133 A | 3/1986 | Umpleby | |
| 4,675,349 A * | 6/1987 | Palombo et al. | 152/209.5 |
| 4,704,425 A | 11/1987 | Lagarde et al. | 524/492 |
| 4,820,751 A | 4/1989 | Takeshita et al. | 523/215 |
| 4,942,192 A | 7/1990 | Yasuda et al. | 524/44 |
| 5,116,886 A | 5/1992 | Wolff et al. | 523/209 |
| 5,266,620 A | 11/1993 | Shinoda et al. | 524/495 |
| 5,324,806 A | 6/1994 | Wengrovius et al. | 528/10 |
| 5,341,863 A * | 8/1994 | Sandstrom et al. | 152/209.1 |
| 5,387,637 A | 2/1995 | Sullivan | 524/493 |
| 5,409,969 A * | 4/1995 | Hamada | 523/213 |
| 5,510,430 A | 4/1996 | Rubinsztajn et al. | 525/478 |
| 5,530,076 A * | 6/1996 | Eguchi et al. | 525/478 |
| 5,623,028 A * | 4/1997 | Fitzgerald et al. | 525/474 |
| 5,770,754 A | 6/1998 | Scholl | 556/427 |
| 5,780,538 A * | 7/1998 | Cohen et al. | 524/494 |
| 5,886,074 A | 3/1999 | Sandstrom et al. | 524/291 |
| 6,005,027 A | 12/1999 | Guillet et al. | 523/209 |
| 6,028,143 A | 2/2000 | Mukai | 525/232 |
| 6,036,800 A | 3/2000 | Corvasce | |
| 6,037,418 A | 3/2000 | Mukai et al. | 525/242 |
| 6,072,012 A | 6/2000 | Juen et al. | 525/478 |
| 6,075,087 A | 6/2000 | Juen et al. | 524/588 |
| 6,127,468 A | 10/2000 | Cruse et al. | 524/225 |
| 6,140,393 A | 10/2000 | Bomal et al. | 523/213 |
| 6,204,339 B1 | 3/2001 | Waldman et al. | 525/350 |
| 6,245,834 B1 | 6/2001 | Bomal | |
| 6,251,976 B1 | 6/2001 | Scholl et al. | 524/386 |
| 6,274,753 B1 | 8/2001 | Krafczyk et al. | 556/405 |
| 6,303,821 B1 | 10/2001 | Wideman et al. | 564/328 |
| 6,414,061 B1 | 7/2002 | Cruse et al. | 524/262 |
| 6,528,673 B2 | 3/2003 | Cruse et al. | 556/427 |
| 6,608,125 B2 | 8/2003 | Cruse et al. | |
| 6,683,135 B2 | 1/2004 | Cruse et al. | |
| 7,074,876 B2 | 7/2006 | Cruse et al. | |
| 7,078,551 B2 | 7/2006 | Cruse et al. | |
| 7,081,500 B2 | 7/2006 | Cruse et al. | |
| 7,122,590 B2 | 10/2006 | Cruse et al. | |
| 7,138,537 B2 | 11/2006 | Cruse et al. | |
| 2002/0055568 A1 | 5/2002 | Cruse | |
| 2005/0277717 A1 | 12/2005 | Joshi et al. | |

FOREIGN PATENT DOCUMENTS

AU 10082/97 7/1997

(Continued)

OTHER PUBLICATIONS

Lewis, Richard. Hawley's Condensed Chemical Dictionary. Van Nostrand Reinhold Company. 12th Ed. 1993. pp. 1, 598-599, 790, 1141.*

(Continued)

Primary Examiner—Edward J Cain
(74) Attorney, Agent, or Firm—Dominick G. Vicari

(57) ABSTRACT

A method for increasing the hardness of silica/rubber mixtures includes blending with the mixture at least one silane and a hardness-increasing amount of at least one member selected from the group consisting of thixotropic fumed silica, precipitated silica and an MQ resin, wherein Q is $SiO_{4/2}$, M is $R^1R^2R^3SiO_{1/2}$, and $R^1$, $R^2$, and $R^3$ are the same or different functional or non-functional organic groups, carbon black, a thermoplastic resin or a thermosetting resin.

20 Claims, 6 Drawing Sheets

FOREIGN PATENT DOCUMENTS

| | | | |
|---|---|---|---|
| AU | 10082-97 | | 7/1997 |
| AU | 730753 | | 3/2001 |
| CN | 1242774 A | | 8/1998 |
| DE | 2508931 | | 9/1976 |
| EP | 0265070 | | 10/1991 |
| EP | 631982 | | 1/1995 |
| EP | 0631982 | | 1/1995 |
| EP | 655480 A2 | * | 5/1995 |
| EP | 732362 A1 | * | 9/1996 |
| EP | 784072 A1 | | 7/1997 |
| EP | 0894819 | | 7/1998 |
| EP | 0 958 298 | | 8/1998 |
| EP | 0894819 | | 2/1999 |
| EP | 894819 | | 2/1999 |
| EP | 964028 | | 12/1999 |
| EP | 967244 A1 | * | 12/1999 |
| EP | 1016442 A2 | | 7/2000 |
| EP | 1113036 A2 | | 7/2001 |
| EP | 1172406 | | 1/2002 |
| EP | 0265070 | | 4/2008 |
| FR | 2556709 | | 6/1985 |
| JP | 62-235368 | | 10/1987 |
| JP | 62235368 | | 10/1987 |
| JP | 63-275609 | | 11/1988 |
| JP | 63270751 | | 11/1988 |
| JP | 63275609 | | 11/1988 |
| JP | 7078155 | | 6/1993 |
| JP | 186606/1995 | | 7/1995 |
| JP | 10204221 | | 8/1998 |
| JP | 11059116 A | * | 3/1999 |
| JP | 2000319451 A | * | 11/2000 |
| KR | 2000031877 | | 6/2000 |
| WO | WO 9319122 A2 | * | 9/1993 |
| WO | 98/17391 | | 4/1998 |
| WO | WO 9845361 A1 | * | 10/1998 |
| WO | WO 99/09036 | | 2/1999 |
| WO | WO 9909036 A1 | * | 2/1999 |
| WO | 99/22951 | | 5/1999 |
| WO | WO 99/31178 | | 6/1999 |
| WO | WO 99/31178 A | | 6/1999 |

OTHER PUBLICATIONS

Harris et al. Silane Coupling in Carbon Reinforced Polyester Resin. Journal of Material Science 4, 1969, 432-438.*
Machine Translation from JPO for JP 11-059116 A.*
JPO computer generated translation of JP 2000-319451, pp. 1-5.*
Gornowicz et al., Preparation of Silylalkanethiols, Organic Research Lab., Dow Corning Corp., XP-002084433, 2918-2924, 1968.
J. Van Alphen, Rubber Chemicals, Plastics and Rubber Research Institute TNO, Delft, Holland, 1973, pp. 2-9.
The Vanderbilt Rubber Handbook, R.F. Ohm, ed. (R.T. Vanderbilt Company, Inc., Norwalk, Connecticut, 1990), pp. 397-426.
Manual for the Rubber Industry, T. Kemperman, S. Koch, and J. Sumner, eds. (Bayer AG, Leverkusen, Germany, 1993).
Vanderbilt Rubber Handbook (1978), pp. 344-346.
J. Am. Chem. Soc., 71, 3570 and 3571 (1949).
Voronkov et al., in Inst. Org. Khim., Irkutsk, Russia.
Wengrovius et al., XXIIth Organosilicon Symposium, Troy NY, Mar. 1994.
Wengrovius et al., 215th ACS National Meeting, Dallas, Mar. 29-Apr. 2, 1998.
Wengrovius et al., Polymer Preprints, vol. 39, No. 1, Mar. 1998, pp. 512 and 513.
D.C. Copley in Polymer Science and Technology (Plenum) 1984, 29 (Adhesion Chemistry) pp. 257-267.
Registered Letter (EPO Form 2002) and EPO Form 2906 re Appln. No. 03 763 461.5 -1220, dated Sep. 29, 2005.
U.S. Appl. No. 11/398,125, filed Apr. 2005, Cruse et al.
U.S. Appl. No. 11/398,132, filed Apr. 2005, Cruse et al.

* cited by examiner

Comparison of Controls and NXT Silane compounds – Viscoelastic response

Effect of high silica loading on viscoelastic response of NXT compounds

Mixing variations with 100 phr silica loaded NXT compounds – Viscoelastic response Effect of CAB-O-SIL®M5 on viscoelastic response of NXT compounds Effect of CAB-O-SIL®TS-530 on viscoelastic response of NXT compounds Effect of CAB-O-SIL®TS-610 on viscoelastic response of NXT compounds

SILICA-RUBBER MIXTURES HAVING IMPROVED HARDNESS

We claim the benefit under Title 35, United States Code, § 120 to U.S. Provisional Application No. 60/394,264 filed Jul. 9, 2002, entitled SILICA-RUBBER MIXTURES HAVING IMPROVED HARDNESS, and U.S. Provisional Application No. 60/451,449, filed Mar. 3, 2003, entitled SILICA-RUBBER MIXTURES HAVING IMPROVED HARDNESS.

BACKGROUND OF THE INVENTION

1. Field of the Invention

The present invention relates to elastomers containing inorganic fillers and silane coupling agents. More particularly, the present invention pertains to such elastomer compositions containing inorganic fillers that have improved dynamic and static hardness coupled with desirable strength, wear resistance, fatigue resistance, improved hysteresis, and the like and to pneumatic tires in which these elastomers are used in the tread.

The term "hardness" is used herein in its broadest technical sense and includes Shore A (ASTM D2240) hardness, IRHD (ASTM D1415, ISO standard) hardness, or other common methods of hardness measurement. Alternatively, the modulus of the rubber compound (G' shear, E' Extensional) measured under small dynamic strains (anywhere from 0 to 10% strain, but preferably closer to 0% strain) will be referred to herein as hardness.

2. Description of Related Art

The use of organofunctional silanes as coupling agents in silica-filled tire tread compounds results in substantial performance benefits, including lower hysteresis, improved wet and ice traction, and high abrasion resistance. Unfortunately, these improvements in performance are usually accompanied by a loss in dynamic stiffness (hardness) of the filled rubber. Polysulfide silanes currently used in silica-filled tire treads lead to lower hardness of the compound and blocked mercaptosilanes (e.g., 3-octanoylthio-1-propyltriethoxysilane) amplify this effect. Chemical interaction of silanes with the silica surface results in a weaker silica "network", i.e., an improved dispersion of the silica in the rubber, thereby reducing the thixotropic benefits of the system. The lack of adequate bound rubber and hydrodynamic interactions between the filler and polymer also causes a reduction in hardness of the rubber. Since hardness of the tread compound is a very important parameter that dictates many of a tire's performance properties, an increase in hardness of compounds containing these silanes is necessary.

From the early 1960's to the present, two families of sulfur-containing silanes have been the most common coupling agents to provide reinforcement in mineral-filled rubbers. The first to be introduced, mercapto-functional silanes, are widely used for effective coupling, but tend to create scorchy compounds and often have noticeable odors. The polysulfidic bis-alkoxysilanes, introduced in the 1970's, provided improved processability and odor. The tradeoff was the requirement to use higher loadings in some formulations. Variations of this family with reduced sulfur content have appeared, providing easier compounding, due to reduced sulfur donation in the high temperature non-productive mix stages typically used for silica compounds. The major growth in recent years in silica/silane-reinforced passenger tire tread formulations using up to 100% silica filler has placed new demands on compounding technology.

Much of the art relating to the use of sulfur-containing coupling agents in rubber involves silanes containing one or more of the following chemical bond types: S—H (mercapto) and S—S (disulfide or polysulfide). Mercaptosilanes have offered superior coupling at substantially reduced loadings. However, their high chemical reactivity with organic polymers leads to unacceptably high viscosities during processing and premature curing (scorch). This undesirability is aggravated by their odor. Hence, a compromise must be found between coupling and the associated final properties, processability, and required loading levels. Polysulfidic silane coupling agents provide this optimal balance of processing and performance characteristics to a certain extent.

Voronkov et al. in *Inst. Org. Khim.*, Irkutsk, Russia and U.S. Pat. No. 3,922,436 disclose acylthioalkyl silanes, such as $CH_3C(=O)S(CH_2)_{1-3}Si(OR)_3$ and $HOC(=O)CH_2CH_2C(=O)S(CH_2)_3Si(OC_2H_5)_3$. In particular, U.S. Pat. No. 3,922,436 discloses organosilanes useful as coupling agents for glass fibers and as flame retardants, formed by reaction of an epoxy, a mercapto, or an amino silane with a carboxylic acid or anhydride, or formed by a Diels-Alder reaction of a halogenated cyclopentadiene with an unsaturated silane.

U.S. Pat. No. 3,957,718 discloses silica-containing mixtures for the improvement of the adhesion of vulcanizable mixtures of natural and/or synthetic rubber to reinforcing fillers or supports of textile and/or metallic fabrics after the vulcanization that substantially consist of (A) active synthetically produced silica or silicates having a specific surface area according to the BET procedure of about 50 to 500 $m^2/g$ and an average primary particle size of from about 5 to 100 and at least one of (B) phenolic resin or aminoplast forming components, namely on the one hand phenols and/or amines and on the other hand aldehydes or aldehyde donors, and/or at least (C) one organosilane which can be a bisalkoxysilylalkyl-oligosulfide of a given formula.

U.S. Pat. No. 4,184,998 discloses the bonding of rubber or other plastics to mineral reinforcements, such as silica pigment, that is brought about by a mercapto alkyl silane without production of foul odors from the mercapto compound by preliminary reversible coupling of the mercapto compound with a material capable of addition reaction, such as toluene diisocyanate. U.S. Pat. No. 4,519,430 discloses a pneumatic radial tire with a tread having from 1 part by weight of hydrated amorphous fine-particle silica per 3 parts of carbon black tread reinforcing filler, to about 3 parts by weight of the silica to 1 part of the carbon black. The amount of silica present is preferably in the range from about 18 parts to about 50 parts by weight per 100 parts of natural or synthetic rubber. When such a tread is compounded with a mercaptosilane in which the mercapto group is reversibly blocked with an isocyanate group, the tread is said to provide reduced rolling resistance without loss of traction. The blocking group in this case can be an aromatic isocyanate group or any other organic group that can readily un-block under vulcanization conditions.

U.S. Pat. No. 4,942,192 discloses a rubber composition for use in tires, particularly bead filler, comprising 2 to about 30 parts by weight of a particular modified novolak resin having a self-curability based on 100 parts by weight of rubber ingredient.

U.S. Pat. No. 5,266,620 discloses a rubber composition for the manufacture of automotive vehicle tires suitably as a bead filler therefor. The composition comprises specified proportions of carbon black, a modified novolak phenolic resin, hexamethylenetetramine and a polymeric cardanol based on a starting rubber component such that the resulting rubber composition has a relatively low rigidity prior to vulcanization and a relatively high dynamic modulus after vulcanization.

U.S. Pat. No. 5,387,637 discloses polybutadiene compositions suitable for molded golf ball core construction. The compositions contain specific naturally occurring, essentially non-reinforcing, crystalline (preferably microcrystalline) silica particles, which have the effect of increasing the resilience and/or hardness of the resulting molded cores.

U.S. Pat. No. 5,886,074 discloses rubber compositions containing o-salicylsalicyclic acid of the formula:

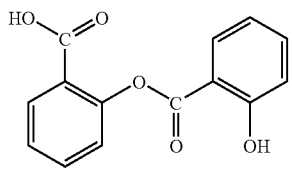

U.S. Pat. No. 6,005,027 discloses blends of silanes and specific silicas, characterized in that when the blend is compounded into a rubber formulation even after four months of storage following formation of the blend, an unexpectedly high proportion of the silane present is available as a coupling and reinforcing agent for the rubber formulation. Over 80% and even over 90% of the silica can be extracted from the blend even four months after formation of the blend, and rubber formulation properties indicate high availability of the silane for coupling and reinforcement.

U.S. Pat. No. 6,028,143 discloses a rubber composition in which the coexistence of low heat build-up, heat resistance and high hardness can be achieved without damaging failure characteristics. A rubber composition comprising 100 parts by weight of matrix rubber and 2-75 parts by weight of a polyethylene composition which contains 0-80% by weight of polyethylene and 20% by weight or more of a composite comprising a polyethylene component and a rubber component previously bonded via a coupling agent to the polyethylene component, said rubber component is crosslinked with the matrix rubber. At least at one of the kneading stages before the final stage, the compound is kneaded so that the maximum temperature of the compound of the kneading of that stage is higher than the melting point of the polyethylene component mixed, preferably, by 10° C. or more.

U.S. Pat. No. 6,037,418 discloses a resin-reinforced elastomer which comprises as principal components, a rubber and a polyolefin having an average particle diameter of at most 1 micrometer, and in which the rubber and the polyolefin are linked together; a process for producing the resin-reinforced elastomer by melt kneading a polyolefin, a No.1 rubber and a binding agent to prepare a thermoplastic composition, adding a No.2 rubber to the resultant thermoplastic composition and melt kneading the mixture thus formed to disperse the polyolefin in the rubber components; and a pneumatic tire using the resin-reinforced elastomer in its tread. The above resin-reinforced elastomer is said to have a uniform modulus and a low density, to be minimized in directionality, and to have excellent tensile strength, fatigue resistance and abrasion resistance.

Australian Patent AU-A-10082/97 discloses the use in rubber silanes of the structure represented by $R^1{}_nX_{3-n}Si\text{-}(Alk)_m(Ar)_p\text{—}S(C\!\!=\!\!O)\text{—}R$; where $R^1$ is phenyl or alkyl; X is halogen, alkoxy, cycloalkoxy, acyloxy, or OH; Alk is alkyl; Ar is aryl; R is alkyl, alkenyl or aryl; n is 0 to 2; and m and p are each 0 or 1, but not both zero.

Japanese Patent Provisional Publication No. 186606/1995 discloses a pneumatic tire that comprises a rubber composition containing a thermoplastic resin in its tread rubber and that is improved in rolling resistance, while maintaining favorable traction characteristics.

Japanese Patent Publication No. 10204221 discloses studless tires comprising treads prepared by mixing hard rubber showing hardness (HD) at 0° of $\geq$70 with $\geq$40 parts of inorganic fillers per 100 parts of hard rubber, partly vulcanizing the compositions, particularizing the compositions to form particles (A), kneading matrix rubber having a glass transition temperature ($T_g$) of –40° C. with 5-50 parts of A particles per 100 parts of matrix rubber, and extruding the compositions to form treads containing A particles. A hard rubber composition with HD 70 and 50 phr ceramic particles with diameters of 150 (micrometers) were mixed, vulcanized, and particularized to form particles. A 70:30 blend of matrix rubber with a $T_g$ of –40° C. and the particles were kneaded to give a tire tread showing skid resistance index (control tire 100) of 112 and abrasion resistance index of 99 on forming a tire comprising the tread.

Japanese Patent JP 63270751 A2 discloses the use of compounds represented by the general formula $CH_2\!\!=\!\!C(CH_3)C(\!\!=\!\!O)S(CH_2)_{1\text{-}6}Si(OCH_3)_3$ in tire tread compositions.

Korean Patent Publication No. 2000031877 discloses a rubber composition for tire treads said to have improved wear, driving, braking, and handling performance comprising 50 wt % styrene butadiene rubber (SBR) containing 23.5% styrene, 20-30 wt % SBR containing 40-50% styrene, 70-80 wt % carbon black, and 3-5 wt % toluol rosin, which is said to improve composition hardness, and additives. The synthetic rubber used comprises 59 wt % SBR with 23.5% styrene, 20-30 wt % styrene with 40-50 wt % styrene and 20-30 wt % BR, wherein the SBR content increases driving/braking performance, but decreases wear performance.

EP 894819 discloses a method for decreasing dynamic modulus without decreasing hardness in silica tread compounds in tires. The tread composition comprises an elastomer including a performance-enhancing package comprising silica, carbon black, and a silica replacement. The replacement replaces up to 40 percent by weight of the silica and yet maintains one or more selected performance properties as if the performance enhancement package were pure carbon black and silica. The replacement is kaolin clay present in conjunction with a silane coupling agent.

EP 964028 discloses compositions of triazoles, such as benzotriazole or tolyltriazole, in silica reinforced rubber compositions for tire components and tires made of such compounds. It is said that this results in high cure rate, cure efficiency, hardness, static and dynamic moduli without deleteriously affecting hysteresis. Methods for optimizing silica reinforced tire properties utilizing triazoles, brass powder and carbon black are also provided.

EP 1172406 discloses a rubber composition for a tire tread that comprises (a) a diene rubber, (b) glass fibers, (c) a reinforcing agent, and 1 to 15 parts by weight of (d-1) inorganic powders having a mohs hardness of less than 6.5 and an average particle size of less than 25 micrometers and/or (d-2) silicone rubber powders based on 100 parts by weight of the diene rubber.

WO99/22951 discloses a pneumatic tire that has belts, gum strips and an overlay that contains 2 to 15 phr thermoplastic reinforcing polymer as an addition to the compound, or as a replacement for 5 to 25 phr carbon black. The tire is said to have good high speed properties.

SUMMARY OF THE INVENTION

Structures formed by carbon black and bound rubber surrounding the surface of the carbon black provide necessary reinforcement and rigidity to the rubber compound. It is possible that thixotropy from this network contributes more towards hardness in the low strain region, whereas bound rubber provides reinforcement in the high strain regions. Nevertheless, there are hydrodynamic interactions that also provide a hardness boost. If carbon black were replaced by precipitated silica (no coupling agent), owing to the extreme thixotropic effects from the silica filler network, the hardness of the system would be very high, but at the expense of poor dispersion and reinforcement. Incorporating a coupling agent eliminates or reduces the filler network effects, thereby leading to a decrease in hardness at low strains. A silane, such as 3-octanoylthio-1-propyltriethoxysilane (also referred to herein as NXT silane), amplifies this effect beyond that found with polysulfidic (TESPT and TESPD) silanes. Adjusting the crosslink density up to the optimal point will help improve this hardness to a certain extent. Then, a reduction of small amounts of oil accompanied by small increases in carbon black loading might bring the hardness values to a level comparable with the controls. In some formulations, it might be impossible to adopt these changes.

In accordance with the present invention, alternate formulation adjustments that bring in more hydrodynamic and hardness contributions in a neutral manner are provided.

In one aspect, the present invention is directed to the use of thixotropic (hydrophilic and hydrophobic) fumed silica or of precipitated silica-silane (preferably 3-octanoylthio-1-propyltriethoxysilane) compounds, or of mixtures of the two.

In another aspect, the present invention is directed to the use of blends of thermoplastic resins with rubber compositions containing silica and silane compounds.

In still another aspect, the present invention is directed to the use of blends of high stiffness resins, i.e., resins having high glass transition temperatures, with rubber compositions containing silica and silane.

In still another aspect, inorganic fillers, such as alumina, calcium carbonate, carbon fibers, glass fibers, kaolin clay, mica, talc, wollastonite, and the like, can also improve the hardness of the silica-filled rubber compound. Preferred loading levels for these components is between 0.1 phr and 50 phr.

The silanes employed in the practice of the present invention can be organofunctional group-substituted silanes having at least one alkoxy group per silicon atom and preferably 2 or 3 alkoxy groups per silicon atom or can be mercaptosilane derivatives in which the mercapto group is blocked ("blocked mercaptosilanes"), i.e., the mercapto hydrogen atom is replaced by another group (hereafter referred to as "blocking group"). Preferably, such silanes are blocked mercaptosilanes in which the blocking group contains an unsaturated heteroatom or carbon chemically bound directly to sulfur via a single bond. This blocking group optionally may be substituted with one or more carboxylate ester or carboxylic acid functional groups.

As noted above, the polysulfide silanes currently used in silica-filled tire treads lead to lower hardness of the compound and the blocked mercaptosilanes, e.g., 3-octanoylthio-1-propyltriethoxysilane, amplify this effect. Chemical interaction of silanes with the silica surface results in a weaker silica "network", thereby reducing the thixotropic benefits of the system. The lack of adequate bound rubber or the lack of hydrodynamic interactions between the filler and polymer also causes a reduction in hardness of the rubber. Since hardness of the tread compound is a very important parameter that dictates many of its performance properties, an increase of hardness of compounds containing these silanes is necessary.

The present invention is directed to means for increasing the hardness of rubbers containing these silanes.

In one embodiment, the present invention is directed to the blending of thermoplastic resins with rubber compositions containing silica and silane compounds. Homogeneous blending of high hardness resins is expected to provide a higher bulk hardness. For efficient incorporation, micronisation of the thermoplastic resin may be necessary before mixing into the rubber compound. This invention includes, but is not limited to, thermoplastic resins, such as high-density polyethylene (HDPE), ultra high molecular weight polyethylene (UHMWPE), and low density-polyethylene (LDPE).

In another embodiment, the present invention is directed to blending high stiffness (high glass transition temperature) resins with rubber compositions containing silica and silane compounds. The blending of high hardness resins is expected to provide a higher bulk hardness. For efficient incorporation, micronisation of the resin may be necessary before mixing into the rubber compound. Some examples of high stiffness resins include phenolic (thermoplastic-novolaks and thermosetting-resoles), polyamide (polyimide), and polycarbonate resins.

In another embodiment, the present invention is directed to the use of carbon black in conjunction with silica-silane rubber compounds. The high surface area from the carbon black provides substantial bound rubber and hydrodynamic reinforcement so as to increase the hardness. Since hysteresis in the compound increases with the addition of black, one of the objectives of the invention is to get as much increase in rigidity as possible with minimal increase in hysteresis. A range of carbon blacks with differing structures (surface area and particle sizes) can be used to achieve the necessary hardness enhancement.

In still another embodiment, the present invention is directed to the use of thixotropic-(hydrophilic and hydrophobic) fumed silica, or of precipitated silica, or of mixtures of the two, in rubber compounds. A description of precipitated and fumed (pyrogenic) silicas is given in the next section. The use of hydrophilic fumed silica results in formation of a strong network, which provides the necessary hardness in the small strain regime. Hydrophobic silica also provides the required hardness enhancement via weaker interactions. However, the side effects of using hydrophobized silica are minimal. Silicas with different types of hydrophobic groups can be employed.

Along with the above described means for increasing the hardness, small amounts of sulfur and/or certain accelerators which do not generate nitrosamines may be needed to increase the bulk crosslink density of the rubber up to the required optimal levels. For example, small amounts of sulfur and/or small amounts of MBTS (bis-mercapto benzothiazole) lead to an optimal crosslink density where the silane compound is 3-octanoylthio-1-propyltriethoxysilane.

More particularly, the present invention is directed to a method for increasing the hardness of silica/rubber mixtures comprising blending with said mixture at least one silane and a hardness-increasing amount of at least one member selected from the group consisting of thixotropic fumed silica; precipitated silica; an MQ resin wherein Q is $SiO_{4/2}$, M is $R^1R^2R^3SiO_{1/2}$, and $R^1$, $R^2$, and $R^3$ are the same or different functional or non-functional organic groups; carbon black; a thermoplastic resin; and a thermosetting resin.

In another aspect, the present invention is directed to an article of manufacture comprising a silica/rubber mixture hardened by blending with said mixture at least one silane and a hardness-increasing amount of at least one member selected from the group consisting of thixotropic fumed silica; precipitated silica; an MQ resin wherein Q is $SiO_{4/2}$, M is $R^1R^2R^3SiO_{1/2}$, and $R^1$, $R^2$, and $R^3$ are the same or different functional or non-functional organic groups; carbon black; a thermoplastic resin; and a thermosetting resin.

DESCRIPTION OF THE PREFERRED EMBODIMENTS

Figure 1:
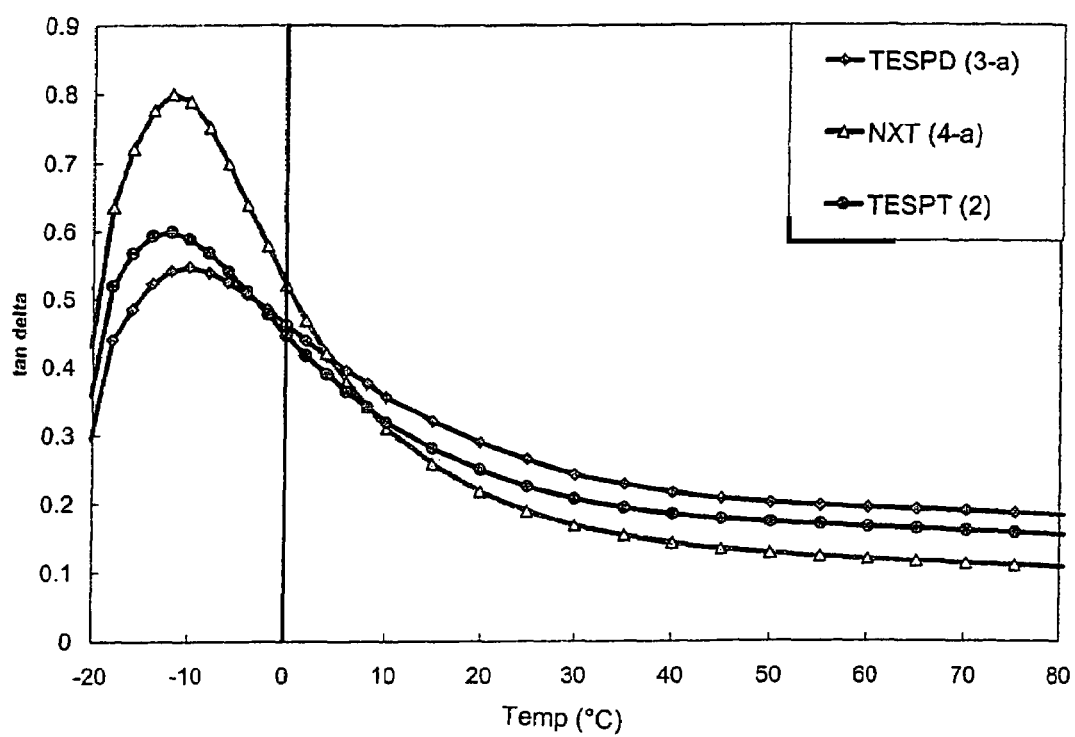
FIG. 1 is a graph depicting a comparison of controls and NXT silane compounds for viscoelastic response.

In silica filled rubber compounds, the addition of silane causes reduction of filler-filler interactions, which can be observed as an improved dispersion of the filler in the rubber. Blocked mercaptosilanes, such as 3-octanoylthio-1-propyl-triethoxysilane, amplify this effect beyond the levels of conventional polysulfidic silanes, such as triethoxysilylpropy-ltetrasulfide (TESPT) and triethoxysilylpropyldisulfide (TESPD). Separation of filler-filler interactions reduces the network effects and consequently the hardness of the rubber compound. On the other hand, creation of silica-rubber bonds via the coupling agent enhances the bound rubber content and the hydrodynamic interactions of the filler. This leads to an increase in hardness. In the case of 3-octanoylthio-1-propyl-triethoxysilane, the hardness decrease from lowered network effects is more than the evolving hydrodynamic hardness due to silica dispersion and silica-rubber coupling. One way of increasing the hardness is to increase the loading of precipitated silica beyond the levels normally used in conventional tire-tread compounds. With a corresponding increase in silane loading, the hardness of 3-octanoylthio-1-propyltri-ethoxysilane-containing compounds can be brought to the level obtained with polysulfidic silane compounds that contain conventional loadings of silica.

Another means of improving hardness is by introducing a "transient network". The term "transient network" as used herein is defined as a structure formed in the rubber compound that provides the necessary hardness increase, while not deleteriously affecting hysteresis. From these discussions, those skilled in the art will understand that there is a need to introduce interfacial area and/or a transient network into the rubber compound with 3-octanoylthio-1-propyltri-ethoxysilane or other silanes. A wide range of inorganic and organic (oligomeric and polymeric) materials can be mixed into the rubber compound in order to achieve this goal.

Following is a description of each of the components that, when mixed and blended into the rubber compound, lead to an increase of hardness.

Silicas

Any precipitated or pyrogenic (fumed) silica, with a BET surface$\leqq$500 m$^2$/g and CTAB specific surface$\leqq$500 m$^2$/g can be used in the practice of this invention. Precipitated silicas (referred to as highly dispersible silicas) are preferred as the main component in the rubber compound. The organofunctional silane reacts with the surface of the precipitated silica, thereby providing the necessary hysteresis and reinforcement benefits. In addition, small amounts of pyrogenic (fumed) silica may be added to the rubber compound to provide the necessary hardness increase. An alternate method of increasing the hardness of the compound would be to increase the loading of precipitated silica (the main filler component in the rubber matrix) beyond those typically employed in silica-rubber compounds for tire treads ($^3$ 85 phr).

The following is a brief description of the preparation and physical characteristics of precipitated and fumed silicas.

Precipitated silica:

Fine particle reinforcing silica is precipitated by the controlled neutralization of sodium silicate solution (water glass) by either sulfuric or carbonic acids. The basic raw materials are those required for the silicate: sand, soda ash (or caustic soda), and water. Dilution with water provides a concentration suitable to produce, together with proper reaction rates, a precipitate of particulates rather than gel agglomerates. Reaction temperature is the major determinant of particle size. Precipitation produces a low solids content slurry of silica and sodium sulfate or sodium carbonate from which the salts are removed by washing, either in a counter current decantation system or during a filter press concentration step. Further filtration, drying, and micronizing steps lead to precipitated silicas that can be used as inorganic fillers for rubber. U.S. Pat. No. 4,704,425 and French Patent No. 2,556,709 exemplify some methods of preparation of precipitated highly dispersible silicas. Some non-limiting examples of such preferred highly dispersible silicas are: the silica Perkasil KS 430 from Akzo, the silicas Zeosil 1165 MP and 85 MP from Rhodia, the silica Hi-Sil 2000 from PPG, the silicas Zeopol 8741 and 8745 from Huber, and Ultrasil VN3 GR from Degussa. The silicas that are more suitable and preferred a CTAB specific surface of between 120 and 200 m$^2$/g, more preferably between 140 and 180 m$^2$/g, and a BET specific surface of between 120 and 200 m$^2$/g, more preferably between 150 and 190 m$^2$/g.

In the case where precipitated silica loading is increased beyond the conventional phr levels, an increase of 1 to 100 phr, preferably 2 to 30 phr, of silica beyond the currently used levels is desired to achieve the desired hardness improvement.

Fumed (pyrogenic) silica:

Fumed silica is typically produced by the vapor phase hydrolysis of a silicon compound, e.g., silicon tetrachloride, in a hydrogen oxygen flame. The combustion process creates silicon dioxide molecules that condense to form particles. The particles collide, attach, and sinter together. The result of these processes is a three dimensional 0.2 to 0.3 micron branched chain aggregate. Once the aggregates cool below the fusion point of silica (1710° C.), further collisions result in mechanical entanglement of the chains, termed agglomeration. Treated grades are manufactured by reacting organosilicones or other compounds with fumed silica. Compared to precipitated silica, fumed silica contains low silanol and adsorbed water contents. In addition, when treated with certain organosilicones, its surface becomes predominantly hydrophobic. This attribute of fumed untreated and treated silica differentiates it from precipitated silicas. In addition, fumed silicas also provide smaller particle sizes. Some non-limiting examples of fumed silicas in this invention are CAB-O-SIL® grade untreated fumed silicas from Cabot Corporation:

| Grade  | Surface Area            |
|--------|-------------------------|
| L-90   | 90 ± 10 m²/g            |
| LM-130 | 130 ± 15 m²/g           |
| LM-150 | 160 ± 15 m²/g           |
| M-5    | 200 ± 25 m²/g           |
| MS-55  | 255 ± 25 m²/g           |
| H-5    | 300 ± 25 m²/g           |
| HS-5   | 325 ± 25 m²/g           |
| EH-5   | 380 ± 30 m²/g           |

Some non-limiting examples of treated fumed silicas of the CAB-O-SIL® grade include:

| Grade  | Base silica | Treatment            |
|--------|-------------|----------------------|
| TS-610 | LM-130      | Dimethyldichlorosilane |
| TS-720 | M-5         | Polydimethylsiloxane |
| TS-530 | HS-5        | Hexamethyldisilazane |

Where fumed silica is used to improve the hardness of the rubber compound, addition of 0.1 to 20 phr of fumed silica can result in the requirements of the invention, with a range of 0.1 to 10 phr being more preferred.

Carbon Blacks

Carbon blacks with varying surface and geometric characteristics can be useful in the practice of this invention. Generally, high surface area carbon blacks contribute substantially towards improvement of hardness and reinforcement of the rubber, but also result in a decrease of resilience characteristics. The following are some non-limiting examples[a] of carbon blacks that are suitable for this invention:

| Grade | Iodine absorption No. (g/kg) | DBP No. $10^{-5}$ m³/kg | CTAB No. $10^3$ m²/kg |
|-------|------------------------------|-------------------------|-----------------------|
| N-110 | 145                          | 113                     | 126                   |
| N-121 | 121                          | 132                     | 121                   |
| N-234 | 120                          | 125                     | 119                   |
| N-330 | 82                           | 102                     | 82                    |
| N-339 | 90                           | 120                     | 93                    |
| N-375 | 90                           | 114                     | 96                    |
| N-550 | 43                           | 121                     | 42                    |
| N-660 | 36                           | 90                      | 36                    |
| N-990 | —                            | 43                      | 9                     |

[a]General test methods, Carbon black, Vol. 9, ASTM 1995, D1765

Where carbon black is used to improve the hardness of the rubber compound, an addition of 0.1 to 50 phr of carbon black can result in the requirements of the invention. A range of 0.1 to 20 phr is more preferred.

Thermoplastic, Thermosetting, and High Glass Transition Resins

In another embodiment of this invention, the hardness of the rubber compound is increased by blending with thermoplastic, thermosetting, and high glass transition resins. An overview of many of these polymers is given in "Handbook of Plastic Materials and Technology", Ed. I. Rubin, John Wiley & Sons, Inc. 1990.

HDPE (high density polyethylene) and UHMW PE (ultra high molecular weight polyethylene) are thermoplastic materials that can be blended with the rubber compound, so as to improve the hardness of the final tread compound. HDPE is a partially crystalline, partially amorphous material. UHMW PE has very high molecular weight, and can be used as high modulus filler in the rubber compound. Both these resins can be mixed with rubber in the range of 0.1 to 80 phr, with 1 to 20 phr being a more preferred range.

Phenolic resins are thermosetting resins, typically hard, stiff (high-modulus) polymers. They are most commonly the reaction products of phenol and formaldehyde. There are two types of phenolic resins: Novolaks—two step resins and Resols—one step resins. When these materials are blended with the rubber compound, a loading of 0.1 to 50 phr can increase the hardness, with 0.1 to 30 phr being more preferred.

Some non-limiting examples of high glass transition polymers are: 6 (PMMA). Preferred loading levels for these components is between 0.1 phr and 50 phr.

MQ Resins

Derivatives of TEOS (tetraethoxysilane), TMOS (tetramethoxysilane)—termed the "MQ" resins, and polyhedral oligomeric silsesquioxanes are also non-limiting examples of this invention. Preferred loading levels for these components is between 0.1 phr and 50 phr.

MQ resins are low molecular weight, hyperbranched polymers having the hydrophobic character of organosilicones and a rigidity similar to colloidal silica. With regard to the hardness of the rubber compound, these materials can offer a substantial improvement in hydrodynamic reinforcement. The presence of M groups, e.g., trimethyl siloxy surface, imparts a relatively neutral nature to their surface. MQ resins are used in a variety of applications, such as, for example, pressure sensitive adhesives, liquid injection molding applications, paper release coatings, and personal care products. The "MQ" resins employed in practice of the present invention are macromolecular polymers comprising $R^a R^b R^c SiO_{1/2}$, and $SiO_{4/2}$, units (the M and Q units, respectively) wherein $R^a$, $R^b$ and $R^c$ are the same or different and are functional or non-functional organic groups, including, but not limited to, alkyl, alkenyl, aryl, and arylalkyl groups. As used herein, alkyl includes straight, branched and cyclic alkyl groups; alkenyl includes any straight, branched, or cyclic alkenyl group containing one or more carbon-carbon double bonds; aryl includes any aromatic hydrocarbon from which one hydrogen atom has been removed; and arylalkyl includes any of the aforementioned alkyl groups in which one or more hydrogen atoms have been substituted by the same number of like andlor different aryl (as defined herein) substituents and. Specific examples of alkyls include methyl, ethyl, propyl, isobutyl. In general, alkyls containing from 1 to about 10, preferably from 1 to about 3, carbon atoms are preferred in the practice of this invention. Specific examples of alkenyls include vinyl, propenyl, allyl, methallyl, ethylidenyl norbornane, ethylidene norbornyl, ethylidenyl norbornene, and ethylidene norbornenyl.

Specific examples of aryls include phenyl and naphthalenyl. Specific examples of aralkyls include benzyl and phenethyl. Specific examples of arenyls include tolyl and xylyl. A computer generated molecular structure of a common commercially prepared MQ resin has been reported by Wengrovius et al. at the XXIIth Organosilicon symposium, Troy N.Y. March 1994.

The structure of an MQ resin is defined by three characterization parameters: M/Q ratio, molecular weight, and % OH.

Most commercially useful MQ resins have an M/Q ratio between 0.6 and 1. Ratios lower than 0.6 result in insoluble solids, whereas those greater than 1 produce liquids. Molecular weight is related to M/Q ratio: higher molecular weights are associated with lower MQ ratios. The silanol content (% OH by weight) of these resins, typically ranging between 0 and 3%, is process dependent. IR studies indicate that OH groups are intramolecularly associated through hydrogen bonding.

More detailed descriptions of MQ resins can be found in the conference proceedings from the 215$^{th}$ ACS National meeting, Dallas, Mar. 29-Apr. 2 (1998) by Wengrovius et al. In this article the performance of MQ-PDMS interpenetrating networks (IPN's) in silicone products is discussed on the basis of molecular level interactions between the rigid MQ resin and flexible PDMS components. Yet another article by B. C. Copley in Polymer Science and Technology (Plenum) 1984, 29 (Adhesion Chemistry) 257-67 discusses the use of MQ resins in silicone pressure adhesives.

Reference to or use of MQ resins appears in several patents. For example, U.S. Pat. Nos. 5,510,430; 6,072,012; and European Patent 1016442 A2 disclose the preparation of MQ resins and their use in foam control compositions. U.S. Pat. No. 6,075,087 relates to resin-fillers having monofunctional siloxane (M) units and tetrafunctional siloxane (Q) units that are chemically linked. These resins have properties more similar to those of silica fillers and less like those of MQ resins with trimethyl siloxy units. These resin fillers have been reported to form homogeneous blends with silicone polymers, and dramatically impact modulus and viscosity of a polymer even at low loading levels. EP 1113036 A2 describes a continuous process for producing a silicon resin (MQ resin). In a preferred embodiment, the process of this invention comprises continuously capping the quenched silica hydrosol in a reaction medium comprising water and a liquid selected from the group consisting of organic solvents, siloxane fluids, and mixtures thereof with an organosilicon capping compound to form the MQ resin. This process permits consistent, reproducible production of silicon resins having narrow molecular weight distributions and high silanol content. U.S. Pat. No. 5,324,806 describes a method for making free-flowing silicone resin powder that can be blended with a silicone fluid to produce a stable dispersion. In accordance with a further embodiment of the present invention, MQ resins can be reacted with organofunctional silanes (described below) to form a reaction product that can be utilized in accordance with the invention. In addition, physical blends of MQ resins and organofunctional silanes can be employed.

Organofunctional Silanes

As noted above, the presence of an organofunctional silane will normally increase the dispersion of the silica in the rubber. However, with increased dispersion, the hardness of the rubber composition is decreased. The present invention is thus directed to overcoming this problem by the addition of various additives to the composition.

Any organofunctional group-substituted silane with at least one alkoxy group per silicon atom and preferably two or three alkoxy groups per silicon atom is suitable for use herein. The organofunctional groups are those typically found in organic chemistry and include groups such as mercapto, sulfide, disulfide, polysulfide, vinyl, acetylene, ureido, carboxyl, carbonyl, amino, epoxy, halide, and the like.

These organofunctional silanes can be defined by the chemical formula:

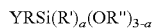

$YRSi(R')_a(OR'')_{3-a}$ wherein

R is a divalent alkylene, arylene or aralkylene group of 1 to 20 carbon atoms, a vinyl group, or acetylenyl;

R' is a monovalent alkyl, aryl, or aralkyl group of 1 to 10 carbon atoms;

R" is a monovalent alkyl, aryl or aralkyl group of 1 to 12 carbon atoms, wherein one or more of the carbon atoms can be replaced with a heteroatom, such as oxygen, nitrogen or sulfur;

Y is an organofunctional group selected from the group consisting of mercapto, sulfides, and polysulfides of the structure R'"—S$_x$— where R'" is a monovalent alkyl, aryl, or aralkyl group of 1 to 20 carbon atoms or the radical —RSiR'$_a$(OR")$_{3-a}$, and x is 1 to 9, which resulting molecule must contain at least one alkoxysilane bond; other bis, tris, and higher silanes with sulfur or other heteroatom linkages in the groups between the alkoxy silane groups; vinyl; acetylenyl; carbonyl; amino; alkyl, aralkyl, or aryl substituted amino; ureido; thiocyanate; thiourea; epoxy; hydrogen; and the like; and a is an integer and is 0, 1, or 2. In some cases, low molecular weight condensates of such silanes may be used.

Examples of such silanes are 3-mercaptopropyltrimethoxysilane, 3-mercaptopropyltriethoxysilane, bis-(3-triethoxysilylpropyl) tetrasulfide (TESPT), vinyltrimethoxysilane, vinyl triethoxysilane, vinyl tris-(2-methoxyethoxy)silane, all commercially available from Crompton Corporation. Di-functional silanes or monofunctional silanes, such as mercaptopropylmethyldiethoxysilane, mercaptopropyldimethylethoxysilane, and vinyl methyl dimethoxysilane, may also be used.

Preferred organofunctional silanes are those with low condensation rates, particularly sulfur-containing silanes substituted with one, two, or three ethoxy or higher molecular weight alkoxy groups on each silicon atom, such as, for example, 3-mercaptopropyltriethoxysilane, bis-(3-triethoxysilylpropyl)tetrasulfide, bis-(3-methyldiethoxysilylpropyl)-tetrasulfide, bis-(3-triethoxysilylpropyl)disulfide (TESPD), bis-(3-triethoxysilylpropyl)monosulfide, bis-(2-triethoxysilylethyltolylene)tetrasulfide, bis-2-(3-triethoxysilyl-5-methylphenyl)ethyl trisulfide, bis-(tributoxysilylmethyl) disulfide, bis(3-methyldiethoxysilylpropyl) disulfide, thiocyanatopropyltriethoxysilane, thioureidopropyl-tris-(isopropoxy)silane, and the like.

Epoxy and aminosilanes are also suitable for use herein, although they are inherently less stable. For example (-aminopropyltriethoxysilane may also be used.

In a preferred embodiment of the present invention, the silane additive employed is of the generic formula:

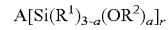

$A[Si(R^1)_{3-a}(OR^2)_a]_r$ wherein

A is a group of valence r, r being an integer greater than or equal to 1, selected from the group consisting of linear, branched, or cyclic hydrocarbon groups, an oxygen atom, or a linear, branched, or cyclic siloxane or polysiloxane group, each of which save an oxygen atom may contain substituents with oxygen, nitrogen, sulfur, or halogen heteroatoms;

$R^1$ is selected from the group consisting of hydrocarbyl, hydrogen, and chain-substituted hydrocarbyl;

$R^2$ is selected from the group consisting of hydrocarbyl and chain-substituted hydrocarbyl; and a is 0, 1, 2, or 3.

If r is 1, A is R'"Y wherein R" is a divalent linear, branched, or cyclic hydrocarbon group, and Y is hydrogen, halogen, an N-bonded group, e.g., amine, imine, carbamate, isocyanate, isocyanurate, and the like; an O-bonded group, e.g., ester, ether, polyether group, and the like; an S-bonded group, e.g., mercaptan, blocked mercaptan, thioether, thioester, sulfide, polysulfide, and the like; or a C-bonded group, e.g., carbonyl or a carbonyl derivative, such as acetal, ketal, thioketal and the like, cyanide, cyanate, thiocyanate, and the like.

More preferably, the silanes employed in the practice of the present invention are blocked mercaptosilanes that can be represented by the Formulas (1-2):

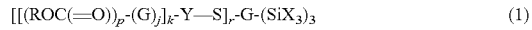  (1)

  (2)

wherein

Y is a polyvalent species (Q)$_z$A'(=E), preferably selected from the group consisting of —C(=NR)—; —SC(=NR)—; —SC(=O)—; (—NR)C(=O)—; (—NR)C(=S)—; —OC(=O)—; —OC(=S)—; —C(=O)—; —SC(=S)—; —C(=S)—; —S(=O)—; —S(=O)$_2$—; OS(=O)$_2$—; (—NR)S(=O)$_2$—; —SS(=O)—; —OS(=O)—; (—NR)S(=O)—; —SS(=O)$_2$—; (—S)$_2$P(=O)—; —(—S)P(=O)—; —P(=O)(—)$_2$; (—S)$_2$P(=S)—; —(—S)P(=S)—; —P(=S)(—)$_2$; (—NR)$_2$P(=O)—; (—NR)(—S)P(=O)—; (—O)(—NR)P(=O)—; (—O)(—S)P(=O)—; (—O)$_2$P(=O)—; —(—O)P(=O)—; —(—NR)P(=O)—; (—NR)$_2$P(=S)—; (—NR)(—S)P(=S)—; (—O)(—NR)P(=S)—; (—O)(—S)P(=S)—; (—O)$_2$P(=S)—; —(—O)P(=S)—; and —(—NR)P(=S)—; each wherein the atom (A') attached to the unsaturated heteroatom (E) is attached to the sulfur, which in turn is linked via a group G to the silicon atom;

each R is chosen independently from hydrogen, straight, cyclic, or branched alkyl that may or may not contain unsaturation, alkenyl groups, aryl groups, and aralkyl groups, with each R containing from 1 to 18 carbon atoms;

each G is independently a monovalent or polyvalent group derived by substitution of alkyl, alkenyl, aryl, or aralkyl wherein G can contain from 1 to 18 carbon atoms, with the proviso that G is not such that the silane would contain an α,β-unsaturated carbonyl including a carbon-carbon double bond next to the thiocarbonyl group, and if G is univalent (i.e., if p =0), G can be a hydrogen atom;

X is independently a group selected from the group consisting of —Cl, —Br, RO—, RC(=O)O—, R$_2$C=NO—, R$_2$NO— or R$_2$N—, —R, —(OSiR$_2$)$_1$(OSiR$_3$) wherein each R and G is as above and at least one X is not —R;

Q is oxygen, sulfur, or (—NR—);

A' is carbon, sulfur, phosphorus, or sulfonyl;

E is oxygen, sulfur, or NR;

p is 0 to 5; r is 1 to 3; z is 0 to 2; q is 0 to 6; a is 0 to 7; b is 1 to 3; j is 0 to 1, but it may be 0 only if p is 1; c is 1 to 6, preferably 1 to 4; t is 0 to 5; s is 1 to 3; k is 1 to 2, with the provisos that (A) if A' is carbon, sulfur, or sulfonyl, then
  (i) a+b=2 and
  (ii) k=1;
(B) if A' is phosphorus, then a+b=3 unless both (i) c>1 and (ii) b=1, in which case a=c+1; and
(C) if A' is phosphorus, then k is 2.

As used herein, "alkyl" includes straight, branched, and cyclic alkyl groups, and "alkenyl" includes straight, branched, and cyclic alkenyl groups containing one or more carbon-carbon double bonds. Specific alkyls include methyl, ethyl, propyl, isobutyl, and specific aralkyls include phenyl, tolyl and phenethyl. As used herein, "cyclic alkyl" or "cyclic alkenyl" also includes bicyclic and higher cyclic structures, as well as cyclic structures further substituted with alkyl groups. Representative examples include norbornyl, norbornenyl, ethylnorbornyl, ethylnorbornenyl, ethylcyclohexyl, ethylcyclohexenyl, and cyclohexylcyclohexyl.

Representative examples of the functional groups (—YS—) present in the silanes of the present invention include thiocarboxylate ester, —C(=O)—S— (any silane with this functional group is a "thiocarboxylate ester silane"); dithiocarboxylate, —C(=S)—S— (any silane with this functional group is a "dithiocarboxylate ester silane"); thiocarbonate ester, —OC(=O)—S— (any silane with this functional group is a "thiocarbonate ester silane"); dithiocarbonate ester, —SC(=O)S— and —OC(=S) S— (any silane with this functional groups is a "dithiocarbonate ester silane"); trithiocarbonate ester, —SC(=S)S— (any silane with this functional group is a "trithiocarbonate ester silane"); dithiocarbamate ester, (—N—)C(=S)S— (any silane with this functional groups is a "dithiocarbamate ester silane"); thiosulfonate ester, —S(=O)$_2$S— (any silane with this functional group is a "thiosulfonate ester silane"); thiosulfate ester, —OS(=O)$_2$S— (any silane with this functional group is a "thiosulfate ester silane"); thiosulfamate ester, (—N—)S(=O)$_2$S— (any silane with this functional group is a "thiosulfamate ester silane"); thiosulfinate ester, —S(=O)S— (any silane with this functional group is a "thiosulfinate ester silane"); thiosulfite ester, —OS(=O)S— (any silane with this functional group is a "thiosulfite ester silane"); thiosulfimate ester, (—N—)S(=O)S— (any silane with this functional group is a "thiosulfimate ester silane"); thiophosphate ester, P(=O)(O—)$_2$(S—) (any silane with this functional group is a "thiophosphate ester silane"); dithiophosphate ester, P(=O)(O—)(S—)$_2$ or P(=S)(O—)$_2$(S—) (any silane with this functional group is a "dithiophosphate ester silane"); trithiophosphate ester, P(=O)(S—)$_3$ or P(=S)(O—)(S—)$_2$ (any silane with this functional group is a "trithiophosphate ester silane"); tetrathiophosphate ester P(=S)(S—)$_3$ (any silane with this functional group is a "tetrathiophosphate ester silane"); thiophosphamate ester, —P(=O)(—N—)(S—) (any silane with this functional group is a "thiophosphamate ester silane"); dithiophosphamate ester, —P(=S)(—N—)(S—) (any silane with this functional group is a "dithiophosphamate ester silane"); thiophosphoramidate ester, (—N—)P(=O)(O—)(S—) (any silane with this functional group is a "thiophosphoramidate ester silane"); dithiophosphoramidate ester, (—N—)P(=O)(S—)$_2$ or (—N—)P(=S)(O—)(S—) (any silane with this functional group is a "dithiophosphoramidate ester silane"); trithiophosphoramidate ester, (—N—)P(=S)(S—)$_2$ (any silane with this functional group is a "trithiophosphoramidate ester silane").

Particularly preferred are —OC(=O)—; —SC(=O)—; —S((=O)—; —OS(=O)—; —(—S)P(=O)—; and —P(=O)(—)$_2$.

Another silane would be one wherein Y is —C(=O)— and G has a primary carbon attached to the carbonyl (Y) and is a C$_2$-C$_{12}$ alkyl, more preferably a C$_6$-C$_8$ alkyl.

Another preferred structure is of the form X$_3$SiGSC(=O)GC(=O)SGSiX$_3$ wherein G is a divalent hydrocarbon.

Examples of G include —(CH$_2$)$_n$— wherein n is 1 to 12, diethylene cyclohexane, 1,2,4-triethylene cyclohexane, and diethylene benzene. It is preferred that the sum of the carbon atoms within the G groups within the molecule are from 3 to 18, more preferably 6 to 14. This amount of carbon in the blocked mercaptosilane facilitates the dispersion of the inorganic filler into the organic polymers, thereby improving the balance of properties in the cured filled rubber.

Preferred R groups are alkyls of $C_1$ to $C_4$ and hydrogen.

Specific examples of X are methoxy, ethoxy, isobutoxy, propoxy, isopropoxy, acetoxy, and oximato. Methoxy, acetoxy, and ethoxy are preferred. At least one X must be reactive (i.e., hydrolyzable).

Preferred embodiments are wherein p is 0 to 2; X is RO— or RC(=O)O—; R is hydrogen, phenyl, isopropyl, cyclohexyl, or isobutyl; G is a substituted phenyl or substituted straight chain alkyl of $C_2$ to $C_{12}$. The most preferred embodiments include those wherein p is zero, X is ethoxy, and G is a $C_3$-$C_{12}$ alkyl derivative.

Representative examples of the silanes of the present invention include: 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl-1-ethyl)-4-thioacetylnorbornene; 1-(1-oxo-2-thia-5-triethoxysilylpenyl)benzoic acid; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctoate; 3-triethoxysilyl-1-propyl thiopalmitate; 3-triethoxysilyl-1-propyl thiooctoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulphate; 3-triethoxysilyl-1-propylmethanethiosulphonate; 3-triethoxysilyl-1-propylethanethiosulphonate; 3-triethoxysilyl-1-propylbenzenethiosulphonate; 3-triethoxysilyl-1-propylethenethiosulphonate; 3-triethoxysilyl-1-propylnaphthalenethiosulphonate; 3-triethoxysilyl-1-propylxylenethiosulphonate; triethoxysilylmethylmethylthiosulphate; triethoxysilylmethylmethanethiosulphonate; triethoxysilylmethylethanethiosulphonate; triethoxysilylmethylbenzenethiosulphonate; triethoxysilylmethyltoluenethiosulphonate; triethoxysilylmethylnaphthalenethiosulphonate; triethoxysilylmethylxylenethiosulphonate; and the like.

The most preferred silane for use in the practice of the present invention is 3-octanoylthio-1-propyltriethoxysilane.

Blocked mercaptosilanes are known in the art. See, for example, U.S. Pat. Nos. 4,519,430; 6,127,468; 6,204,339; 6,414,061; and 6,528,673.

Mixtures of various blocked mercaptosilanes may be used, including those wherein synthetic methods result in a distribution of various silanes or where mixes of blocked mercaptosilanes are used for their various blocking or leaving functionalities. Moreover, it is understood that the partial hydrolyzates of these blocked mercaptosilanes (i.e., blocked mercaptosiloxanes) may also be encompassed by the blocked mercaptosilanes herein, in that these partial hydrolyzates will be a side product of most methods of manufacture of the blocked mercaptosilane or can occur upon storage of the blocked mercaptosilane, especially in humid conditions.

The silane, if liquid, may be loaded on a carrier, such as a porous polymer, carbon black, or silica, so that it is in solid form for delivery to the rubber. In a preferred mode, the carrier would be part of the inorganic filler to be used in the rubber.

The methods of preparation for blocked mercaptosilanes can involve esterification of sulfur in a sulfur-containing silane and direct incorporation of the thioester group in a silane, either by substitution of an appropriate leaving group or by addition across a carbon-carbon double bond. Illustrative examples of synthetic procedures for the preparation of thioester silanes would include:

Reaction 1) the reaction between a mercaptosilane and an acid anhydride corresponding to the thioester group present in the desired product;

Reaction 2) reaction of an alkali metal salt of a mercaptosilane with the appropriate acid anhydride or acid halide;

Reaction 3) the transesterification between a mercaptosilane and an ester, optionally using any appropriate catalyst such as an acid, base, tin compound, titanium compound, transition metal salt, or a salt of the acid corresponding to the ester;

Reaction 4) the transesterification between a thioester silane and another ester, optionally using any appropriate catalyst such as an acid, base, tin compound, titanium compound, transition metal salt, or a salt of the acid corresponding to the ester;

Reaction 5) the transesterification between a 1-sila-2-thiacyclopentane or a 1-sila-2-thiacyclohexane and an ester, optionally using any appropriate catalyst such as an acid, base, tin compound, titanium compound, transition metal salt, or a salt of the acid corresponding to the ester;

Reaction 6) the free radical addition of a thioacid across a carbon-carbon double bond of an alkene-functional silane, catalyzed by UV light, heat, or the appropriate free radical initiator wherein, if the thioacid is a thiocarboxylic acid, the two reagents are brought into contact with each other in such a way as to ensure that whichever reagent is added to the other is reacted substantially before the addition proceeds; and Reaction 7) the reaction between an alkali metal salt of a thioacid with a haloalkylsilane.

Acid halides include but are not limited to, in addition to organic acid halides, inorganic acid halides such as $POT_3$, $SOT_2$, $SO_2T_2$, $COT_2$, $CST_2$, $PST_3$ and $PT_3$, wherein T is a halide. Acid anhydrides in addition to organic acid anhydrides (and their sulfur analogs) include, but are not limited to, inorganic acid anhydrides, such as $SO_3$, $SO_2$, $P_2O_3$, $P_2S_3$, $H_2S_2O_7$, $CO_2$, COS, and $CS_2$.

Illustrative examples of synthetic procedures for the preparation of thiocarboxylate-functional silanes would include:

Reaction 8) the reaction between a mercaptosilane and a carboxylic acid anhydride corresponding to the thiocarboxylate group present in the desired product;

Reaction 9) reaction of an alkali metal salt of a mercaptosilane with the appropriate carboxylic acid anhydride or acid halide;

Reaction 10) the transesterification between a mercaptosilane and a carboxylate ester, optionally using any appropriate catalyst such as an acid, base, tin compound, titanium compound, transition metal salt, or a salt of the acid corresponding to the carboxylate ester;

Reaction 11) the transesterification between a thiocarboxylate-functional silane and another ester, optionally using any appropriate catalyst such as an acid, base, tin compound, titanium compound, transition metal salt, or a salt of the acid corresponding to the other ester;

Reaction 12) the transesterification between a 1-sila-2-thiacyclopentane or a 1-sila-2-thiacyclohexane and a carboxylate ester, optionally using any appropriate catalyst such as an acid, base, tin compound, titanium compound, transition metal salt, or a salt of the acid corresponding to the carboxylate ester;

Reaction 13) the free radical addition of a thiocarboxylic acid across a carbon-carbon double bond of an alkene-functional silane, catalyzed by UV light, heat, or the appropriate free radical initiator; and Reaction 14) the reaction between an alkali metal salt of a thiocarboxylic acid with a haloalkylsilane.

Reactions 1 and 8 can be carried out by distilling a mixture of the mercaptosilane and the acid anhydride and, optionally, a solvent. Appropriate boiling temperatures of the mixture are in the range of 60° to 200° C.; preferably 70° to 170° C.; more preferably 50° to 250° C. This process leads to a chemical reaction in which the mercapto group of the mercaptosilane is esterified to the thioester silane analog with release of an equivalent of the corresponding acid. The acid typically is more volatile than the acid anhydride. The reaction is driven by the removal of the more volatile acid by distillation. For the more volatile acid anhydrides, such as acetic anhydride, the distillation preferably is carried out at ambient pressure to reach temperatures sufficient to drive the reaction toward completion. For less volatile materials, solvents such as toluene, xylene, glyme, and diglyme can be used with the process to limit temperature. Alternatively, the process can be run at reduced pressure. It is useful to use up to a twofold excess or more of the acid anhydride, which would be distilled out of the mixture after all of the more volatile reaction co-products, comprising acids and non-silane esters, have been distilled out. This excess of acid anhydride serves to drive the reaction to completion, as well as to help drive the co-products out of the reaction mixture. At the completion of the reaction, distillation should be continued to drive out the remaining acid anhydride. The product, optionally, can be distilled.

Reactions 2 and 9 can be carried out in two steps. The first step involves conversion of the mercaptosilane to a corresponding metal derivative. Alkali metal derivatives, especially sodium, but also potassium or lithium, are preferred. The metal derivative can be prepared by adding the alkali metal or a strong base derived from the alkali metal to the mercaptosilane. The reaction occurs at ambient temperature. Appropriate bases include alkali metal alkoxides, amides, hydrides, and mercaptides. Alkali metal organometallic reagents would also be effective. Grignard reagents would yield magnesium derivatives, which would be another alternative. Solvents, such as toluene, xylene, benzene, aliphatic hydrocarbons, ethers, and alcohols, can be used to prepare the alkali metal derivatives. Once the alkali metal derivative is prepared, any alcohol present should be removed, e.g., by distillation or evaporation. Alcohols, such as methanol, ethanol, propanol, isopropanol, butanol, isobutanol, and t-butanol, can be removed by azeotropic distillation with benzene, toluene, xylene, or aliphatic hydrocarbons. Toluene and xylene are preferred; toluene is more preferred.

The second step in the overall process comprises adding to this solution, with stirring, the acid chloride or acid anhydride at temperatures between −20° C. and the boiling point of the mixture, preferably at temperatures between 0° C. and ambient. The product can be isolated by removing the salt and solvent and can be purified by distillation.

Reactions 3 and 10 can be carried out by distilling a mixture of the mercaptosilane and the ester and, optionally, a solvent and/or a catalyst. Appropriate boiling temperatures of the mixture would be above 100° C. This process leads to a chemical reaction in which the mercapto group of the mercaptosilane is esterified to the thioester silane analog with release of an equivalent of the corresponding alcohol. The reaction is driven by the removal of the alcohol by distillation, either as the more volatile species, or as an azeotrope with the ester. For the more volatile esters, the distillation is suitably carried out at atmospheric pressure to reach temperatures sufficient to drive the reaction toward completion. For less volatile esters, solvents, such as toluene, xylene, glyme, and diglyme, can be used with the process to limit temperature. Alternatively, the process can be run at reduced pressure. It is useful to use up to a twofold excess or more of the ester, which would be distilled out of the mixture after all of the alcohol co-product has been distilled out. This excess ester serves to drive the reaction to completion and helps drive the co-product alcohol out of the reaction mixture. At the completion of the reaction, distillation can be continued to drive out the remaining ester.

Reactions 4 and 11 can be carried out by distilling a mixture of the thioester silane and the other ester and, optionally, a solvent and/or a catalyst. Appropriate boiling temperatures of the mixture would be above 80° C.; preferably in the range of from about 100° C. to about 250° C. This process leads to a chemical reaction in which the thioester group of the thioester silane is transesterified to a new thioester silane with release of an equivalent of a new ester. The new thioester silane generally is the least volatile species present. However, the new ester is more volatile than the other reactants. The reaction is driven by the removal of the new ester by distillation. The distillation can be carried out at atmospheric pressure to reach temperatures sufficient to drive the reaction toward completion. For systems containing only less volatile materials, solvents, such as toluene, xylene, glyme, and diglyme, can be used with the process to limit temperature. Alternatively, the process can be run at reduced pressure. It is useful to use up to a twofold excess or more of the other ester, which is distilled out of the mixture after all of the new ester co-product has been distilled out. This excess other ester serves to drive the reaction to completion and helps drive the co-product other ester out of the reaction mixture. At the completion of the reaction, distillation can be continued to drive out the remaining said new ester.

Reactions 5 and 12 can be carried out by heating a mixture of 1-sila-2-thiacyclopentane or the 1-sila-2-thiacyclohexane and the ester with the catalyst. Optionally, the mixture can be heated or refluxed with a solvent, preferably a solvent whose boiling point matches the desired temperature. Optionally, a solvent of higher boiling point than the desired reaction temperature can be used at reduced pressure, the pressure being adjusted to bring the boiling point down to the desired reaction temperature. The temperature of the mixture would be in the range of 80° C. to 250° C.; preferably 100° to 200° C. Solvents, such as toluene, xylene, aliphatic hydrocarbons, and diglyme, can be used with the process to adjust the temperature. Alternatively, the process can be run under reflux at reduced pressure. The most preferred condition is to heat a mixture of the 1-sila-2-thiacyclopentane or the 1-sila-2-thiacyclohexane and the ester without solvent, preferably under inert atmosphere, for a period of 20 to 100 hours at a temperature of 120° to 170° C. using the sodium, potassium, or lithium salt of the acid corresponding to the ester as a catalyst. The process leads to a chemical reaction in which the sulfur-silicon bond of the 1-sila-2-thiacyclopentane or the 1-sila-2-thiacyclohexane is transesterified by addition of the ester across the sulfur-silicon bond. The product is the thioester silane analog of the original 1-sila-2-thiacyclopentane or 1-sila-2-thiacyclohexane. Optionally, up to a twofold excess or more of the ester can be used to drive the reaction toward completion. At the completion of the reaction, the excess ester can be removed by distillation and the product, optionally, can be purified by distillation.

Reactions 6 and 13 can be carried out by heating or refluxing a mixture of the alkene-functional silane and the thioacid. Aspects of Reaction 13 are disclosed in U.S. Pat. No. 3,692,812 and by G. A. Gornowicz et al., in *J. Org. Chem.*, 33(7): 2918-24 (1968). The uncatalyzed reaction can occur at temperatures as low as 105° C., but often fails. The probability of success increases with temperature and becomes high when the temperature exceeds 160° C. The reaction can be made reliable and brought largely to completion by using UV radiation or a catalyst. With a catalyst, the reaction can be made to occur at temperatures below 90° C. Appropriate catalysts are free radical initiators, e.g., peroxides, preferably organic peroxides, and azo compounds. Examples of peroxide initiators include peracids, such as perbenzoic and peracetic acids; esters of peracids; hydroperoxides, such as t-butyl hydroperoxide; peroxides, such as di-t-butyl peroxide; and peroxyacetals and ketals, such as 1,1-bis(t-butylperoxy)cyclohexane, or any other peroxide. Examples of azo initiators include azobisisobutyronitrile (AIBN), 1,1-azobis(cyclohexanecarbonitrile) (VAZO, DuPont product), and azo-tert-butane. The reaction can be run by heating a mixture of the alkene-functional silane and the thioacid with the catalyst. It is preferred for the overall reaction to be run on an equimolar or near equimolar basis to get the highest conversions. The reaction is sufficiently exothermic that it tends to lead to a rapid temperature increase to reflux followed by a vigorous reflux as the reaction initiates and continues rapidly. This vigorous reaction can lead to hazardous boil-overs for larger quantities. Side reactions, contamination, and loss in yield can result as well from uncontrolled reactions. The reaction can be controlled effectively by adding partial quantities of one reagent to the reaction mixture, initiating the reaction with the catalyst, allowing the reaction to run its course largely to completion, and then adding the remains of the reagent, either as a single addition or as multiple additives. The initial concentrations and rate of addition and number of subsequent additions of the deficient reagent depend on the type and amount of catalyst used, the scale of the reaction, the nature of the starting materials, and the ability of the apparatus to absorb and dissipate heat. A second way of controlling the reaction involves the continuous addition of one reagent to the other with concomitant continuous addition of catalyst. Whether continuous or sequential addition is used, the catalyst can be added alone and/or preblended with one or both reagents or combinations thereof. Two methods are preferred for reactions involving thiolacetic acid and alkene-functional silanes containing terminal carbon-carbon double bonds. The first involves initially bringing the alkene-functional silane to a temperature of 160° to 180° C., or to reflux, whichever temperature is lower. The first portion of thiolacetic acid is added at a rate so as to maintain up to a vigorous, but controlled, reflux. For alkene-functional silanes with boiling points above 100° to 120° C., this reflux results largely from the relatively low boiling point of thiolacetic acid (88° to 92° C., depending on purity) relative to the temperature of the alkene-functional silane. At the completion of the addition, the reflux rate rapidly subsides. It often accelerates again within several minutes, especially if an alkene-functional silane with a boiling point above 120° C. is used, as the reaction initiates. If it does not initiate within 10 to 15 minutes, initiation can be brought about by addition of catalyst. The preferred catalyst is di-t-butyl peroxide. The appropriate quantity of catalyst is from 0.2 to 2 percent, preferably from 0.5 to 1 percent, of the total mass of mixture to which the catalyst is added. The reaction typically initiates within a few minutes as evidenced by an increase in reflux rate. The reflux temperature gradually increases as the reaction proceeds. Then the next portion of thiolacetic acid is added, and the aforementioned sequence of steps is repeated. The preferred number of thiolacetic additions for total reaction quantities of about one to about four kilograms is two, with about one-third of the total thiolacetic acid used in the first addition and the remainder in the second. For total quantities in the range of about four to ten kilograms, a total of three thiolacetic additions is preferred, the distribution being approximately 20 percent of the total used in the first addition, approximately 30 percent in the second addition, and the remainder in the third addition. For larger scales involving thiolacetic acid and alkene-functional silanes, it is preferred to use more than a total of three thiolacetic additions and more preferably, to add the reagents in the reverse order. Initially, the total quantity of thiolacetic acid is brought to reflux. This is followed by continuous addition of the alkene-functional silane to the thiolacetic acid at such a rate as to bring about a smooth but vigorous reaction rate. The catalyst, preferably di-t-butylperoxide, can be added in small portions during the course of the reaction or as a continuous flow. It is best to accelerate the rate of catalyst addition as the reaction proceeds to completion to obtain the highest yields of product for the lowest amount of catalyst required. The total quantity of catalyst used should be 0.5 percent to 2 percent of the total mass of reagents used. Whichever method is used, the reaction is followed up by a vacuum stripping process to remove volatiles and unreacted thiolacetic acid and silane. The product may be purified by distillation.

Reactions 7 and 14 can be carried out in two steps. The first step involves preparation of a salt of the thioacid. Alkali metal derivatives are preferred, with the sodium derivative being more preferred. These salts can be prepared as solutions in solvents in which the salt is appreciably soluble, but suspensions of the salts as solids in solvents in which the salts are only slightly soluble are also a viable option. Alcohols, such as propanol, isopropanol, butanol, isobutanol, and t-butanol, and preferably methanol and ethanol are useful because the alkali metal salts are slightly soluble in them. In cases where the desired product is an alkoxysilane, it is preferred to use an alcohol corresponding to the silane alkoxy group to prevent transesterification of the silicon ester. Alternatively, non-protic solvents can be used. Examples of appropriate solvents are ethers or polyethers, such as glyme, diglyme, and dioxanes; N'N-dimethylformamide; N'N-dimethylacetamide; dimethylsulfoxide; N-methylpyrrolidinone; or hexamethylphosphoramide.

Once a solution, suspension, or combination thereof of the salt of the thioacid has been prepared, the second step is to react it with the appropriate haloalkylsilane. This can be accomplished by stirring a mixture of the haloalkylsilane with the solution, suspension, or combination thereof of the salt of the thioacid at temperatures corresponding to the liquid range of the solvent for a period of time sufficient to substantially complete the reaction. Preferred temperatures are those at which the salt is appreciably soluble in the solvent and at which the reaction proceeds at an acceptable rate without excessive side reactions. With reactions starting from chloroalkylsilanes in which the chlorine atom is not allylic or benzylic, preferred temperatures are in the range of 60° to 160° C. Reaction times can range from one hour to several days. For alcohol solvents where the alcohol contains four carbon atoms or fewer, the most preferred temperature is at or near reflux. If diglyme is used as a solvent, the most preferred temperature is in the range of 70° to 120° C., depending on the thioacid salt used. If the haloalkylsilane is a bromoalkylsilane or a chloroalkylsilane in which the chlorine atom is allylic or benzylic, temperature reductions of 30° to 60° C. are appropriate relative to those appropriate for non-benzylic or non-allylic chloroalkylsilanes because of the greater reactivity of the bromo group. Bromoalkylsilanes are preferred over chloroalkylsilanes because of their greater reactivity, lower temperature requirements, and greater ease in filtration or centrifugation of the co-product alkali metal halide. This preference, however, can be overridden by the lower cost of the chloroalkylsilanes, especially for those containing the halogen in the allylic or benzylic position. For reactions between straight chain chloroalkylethoxysilanes and sodium thiocarboxylates to form thiocarboxylate ester ethoxysilanes, it is preferred to use ethanol at reflux for 10 to 20 hours if 5 percent to 20 percent mercaptosilane is acceptable in the product. Otherwise, diglyme would be an excellent choice, in which the reaction would be run preferably in the range of 80° to 120° C. for one to three hours. Upon completion of the reaction, the salts and solvent should be removed, and the product can be distilled to achieve higher purity.

If the salt of the thioacid to be used in Reactions 7 and 14 is not commercially available, it can be prepared by one of two methods, described below as Method A and Method B. Method A involves adding the alkali metal or a base derived from the alkali metal to the thioacid. The reaction occurs at ambient temperature. Appropriate bases include alkali metal alkoxides, hydrides, carbonates, and bicarbonates. Solvents, such as toluene, xylene, benzene, aliphatic hydrocarbons, ethers, and alcohols, can be used to prepare the alkali metal derivatives. In Method B, acid chlorides or acid anhydrides are converted directly to the salt of the thioacid by reaction with the alkali metal sulfide or hydrosulfide. Hydrated or partially hydrous alkali metal sulfides or hydrosulfides are available. However, anhydrous or nearly anhydrous alkali metal sulfides or hydrosulfides are preferred. Hydrous materials can be used, but will result in a loss in yield and hydrogen sulfide formation as a co-product. The reaction involves addition of the acid chloride or acid anhydride to the solution or suspension of the alkali metal sulfide and/or hydrosulfide and heating at temperatures ranging from ambient to the reflux temperature of the solvent for a sufficient period of time to largely complete the reaction, as evidenced by the formation of the co-product salts.

If the alkali metal salt of the thioacid is prepared in such a way that an alcohol is present, either because it was used as a solvent, or because it was formed, as, for example, by the reaction of a thioacid with an alkali metal alkoxide, it may be desirable to remove the alcohol if a product low in mercaptosilane is desired. In this case, it would be necessary to remove the alcohol prior to reaction of the salt of the thioacid with the haloalkylsilane, e.g., by distillation or evaporation. Alcohols, such as methanol, ethanol, propanol, isopropanol, butanol, isobutanol, and t-butanol, are preferably removed by azeotropic distillation with benzene, toluene, xylene, or aliphatic hydrocarbons. Toluene and xylene are preferred.

The blocked mercaptosilanes described herein are useful as coupling agents for organic polymers (i.e., rubbers) and inorganic fillers. The blocked mercaptosilanes are unique in that the high efficiency of the mercapto group can be utilized without the detrimental side effects typically associated with the use of mercaptosilanes, such as high processing viscosity, less than desirable filler dispersion, premature curing (scorch), and odor. These benefits are accomplished because the mercaptan group initially is nonreactive because of the blocking group. The blocking group substantially prevents the silane from coupling to the organic polymer during the compounding of the rubber. Generally, only the reaction of the silane, —$SiX_3$, group with the filler can occur at this stage of the compounding process. Thus, substantial coupling of the filler to the polymer is precluded during mixing, thereby minimizing the undesirable premature curing (scorch) and the associated undesirable increase in viscosity. One can achieve better cured filled rubber properties, such as a balance of processing characteristics and final mechanical properties because of the avoidance of premature curing.

In use, one or more of the blocked mercaptosilanes is mixed with the organic polymer before, during, or after the compounding of the filler into the organic polymer. It is preferred to add the silanes before or during the compounding of the filler into the organic polymer, because these silanes facilitate and improve the dispersion of the filler. The total amount of silane present in the resulting combination should be about 0.05 to about 25 parts by weight per hundred parts by weight of organic polymer (phr), more preferably 1 to 10 phr. Fillers can be used in quantities ranging from about 5 to 100 phr, more preferably from 25 to 80 phr.

When reaction of the mixture to couple the filler to the polymer is desired, a deblocking agent is added to the mixture to deblock the blocked mercaptosilane. The deblocking agent may be added at quantities ranging from about 0.1 to about 5 phr, more preferably in the range of from 0.5 to 3 phr. If alcohol or water is present (as is common) in the mixture, a catalyst (e.g., tertiary amines, Lewis acids, or thiols) may be used to initiate and promote the loss of the blocking group by hydrolysis or alcoholysis to liberate the corresponding mercaptosilane. Alternatively, the deblocking agent may be a nucleophile containing a hydrogen atom sufficiently labile such that the hydrogen atom could be transferred to the site of the original blocking group to form the mercaptosilane. Thus, with a blocking group acceptor molecule, an exchange of hydrogen from the nucleophile would occur with the blocking group of the blocked mercaptosilane to form the mercaptosilane and the corresponding derivative of the nucleophile containing the original blocking group. This transfer of the blocking group from the silane to the nucleophile could be driven, for example, by a greater thermodynamic stability of the products (mercaptosilane and nucleophile containing the blocking group) relative to the initial reactants (blocked mercaptosilane and nucleophile). For example, if the nucleophile were an amine containing an N—H bond, transfer of the blocking group from the blocked mercaptosilane would yield the mercaptosilane and one of several classes of amides corresponding to the type of blocking group used. For example, carboxyl blocking groups deblocked by amines would yield amides, sulfonyl blocking groups deblocked by amines would yield sulfonamides, sulfinyl blocking groups deblocked by amines would yield sulfinamides, phosphonyl blocking groups deblocked by amines would yield phosphonamides, phosphinyl blocking groups deblocked by amines would yield phosphinamides. What is important is that regardless of the blocking group initially present on the blocked mercaptosilane and regardless of the deblocking agent used, the initially substantially inactive (from the standpoint of coupling to the organic polymer) blocked mercaptosilane is substantially converted at the desired point in the rubber compounding procedure to the active mercaptosilane. It is noted that partial amounts of the nucleophile may be used (i.e., a stoichiometric deficiency), if one were to deblock only part of the blocked mercaptosilane to control the degree of vulcanization of a specific formulation.

Water typically is present on the inorganic filler as a hydrate, or bound to filler in the form of a hydroxyl group. The deblocking agent could be added in the curative package or, alternatively, at any other stage in the compounding process as a single component. Examples of nucleophiles would include any primary or secondary amines, or amines containing C=N double bonds, such as imines or guanidines, with the proviso that said amine contains at least one N—H (nitrogen-hydrogen) bond. Numerous specific examples of guanidines, amines, and imines well known in the art, which are useful as components in curatives for rubber, are cited in J. Van Alphen, *Rubber Chemicals,* (Plastics and Rubber Research Institute TNO, Delft, Holland, 1973). Some examples include N,N'-diphenylguanidine, N,N',N''-triphenylguanidine, N,N'-di-ortho-tolylguanidine, orthobiguanide, hexamethylenetetramine, cyclohexylethylamine, dibutylamine, and 4,4'-diaminodiphenylmethane. Any general acid catalysts used to transesterify esters, such as Brönsted or Lewis acids, could be used as catalysts.

In practice, sulfur vulcanized rubber products typically are prepared by thermomechanically mixing rubber and various ingredients in a sequentially stepwise manner followed by shaping and curing the compounded rubber to form a vulcanized product. First, for the aforesaid mixing of the rubber and various ingredients, typically exclusive of sulfur and sulfur vulcanization accelerators (collectively "curing agents"), the rubber(s) and various rubber compounding ingredients typically are blended in at least one, and often (in the case of silica-filled low rolling resistance tires) two, preparatory thermomechanical mixing stage(s) in suitable mixers. Such preparatory mixing is referred to as nonproductive mixing or nonproductive mixing steps or stages. Such preparatory mixing usually is conducted at temperatures up to 140° to 200° C., preferably up to 150° to 180° C. Subsequent to such preparatory mix stages, in a final mixing stage, sometimes referred to as a productive mix stage, deblocking agent, curing agents, and possibly one or more additional ingredients are mixed with the rubber compound or composition, typically at a temperature in a range of 50° to 130° C. This temperature range is a lower range than the temperatures utilized in the preparatory mix stages to prevent or retard premature curing of the sulfur curable rubber, which is sometimes referred to as scorching of the rubber composition. The rubber mixture, sometimes referred to as a rubber compound or composition, typically is allowed to cool, sometimes after or during a process intermediate mill mixing, between the aforesaid various mixing steps, for example, to a temperature of about 50° C. or lower. When it is desired to mold and to cure the rubber, the rubber is placed into the appropriate mold at about at least 130° C. and up to about 200° C., which will cause the vulcanization of the rubber by the mercapto groups on the mercaptosilane and any other free sulfur sources in the rubber mixture.

Thermomechanical mixing means that the rubber compound, or composition of rubber and rubber compounding ingredients, is mixed in a rubber mixture under high shear conditions where it autogenously heats up as a result of the mixing, primarily owing to shear and associated friction within the rubber mixture in the rubber mixer. Several chemical reactions may occur at various steps in the mixing and curing processes.

The first reaction is a relatively fast reaction and is considered herein to take place between the filler and the $SiX_3$ group of the blocked mercaptosilane. Such reaction may occur at a relatively low temperature such as, for example, at about 120° C. The second and third reactions are considered herein to be the deblocking of the mercaptosilane and the reaction which takes place between the sulfuric part of the organosilane (after deblocking), and the sulfur vulcanizable rubber at a higher temperature, for example, above about 140° C.

Another sulfur source may be used, for example, in the form of elemental sulfur as $S_8$. A sulfur donor is considered herein as a sulfur containing compound which liberates free, or elemental, sulfur at a temperature in a range of 140° to 190° C. Examples of such sulfur donors include, but are not limited to, polysulfide vulcanization accelerators and organosilane polysulfides with at least two connecting sulfur atoms in its polysulfide bridge. The amount of free sulfur source addition to the mixture can be controlled or manipulated as a matter of choice relatively independently from the addition of the aforesaid blocked mercaptosilane. Thus, for example, the independent addition of a sulfur source may be manipulated by the amount of addition thereof and by sequence of addition relative to addition of other ingredients to the rubber mixture.

A rubber composition is prepared by a process which comprises the sequential steps 1 5 of:

(A) thermomechanically mixing, in at least one preparatory mixing step, to a temperature of 140° to 200° C., preferably to 140° to 190° C., for a total mixing time of 2 to 20 minutes, preferably 4 to 15 minutes, for such mixing step(s);

(i) 100 parts by weight of at least one sulfur vulcanizable rubber selected from conjugated diene homopolymers and copolymers, and copolymers of at least one conjugated diene and aromatic vinyl compound, (ii) 5 to 100 phr (parts per hundred rubber), preferably 25 to 100 phr, of particulate filler, wherein preferably the filler contains 1 to 85 weight percent carbon black, (iii) 0.05 to 20 parts by weight filler of at least one blocked mercaptosilane;

(B) subsequently blending therewith, in a final thermomechanical mixing step at a temperature to 50° to 130° C. for a time sufficient to blend the rubber, preferably between 1 to 30 minutes, more preferably 1 to 3 minutes, at least one deblocking agent at about 0.05 to 20 parts by weight of the filler and a curing agent at 0 to 5 phr; and, optionally, (C) curing said mixture at a temperature of 130° to 200° C. for about 5 to 60 minutes.

The process may also comprise the additional steps of preparing an assembly of a tire or sulfur vulcanizable rubber with a tread comprised of the rubber composition prepared according to this invention and vulcanizing the assembly at a temperature in a range of 130° to200° C.

Suitable organic polymers and fillers are well known in the art and are described in numerous texts, of which two examples include *The Vanderbilt Rubber Handbook,* R. F. Ohm, ed. (Vanderbilt Company, Inc., Norwalk, Conn., 1990), and *Manual for the Rubber Industry,* T. Kempermann, S. Koch, and J. Sumner, eds. (Bayer A G, Leverkusen, Germany, 1993). Representative examples of suitable polymers include solution styrene-butadiene rubber (SSBR), styrene-butadiene rubber (SBR), natural rubber (NR), polybutadiene (BR), ethylene-propylene co- and terpolymers (EP, EPDM), and acrylonitrile-butadiene rubber (NBR). The rubber composition is comprised of at least one diene-based elastomer, or rubber. Suitable conjugated dienes are isoprene and 1,3-butadiene and suitable vinyl aromatic compounds are styrene and "-methyl styrene. Thus, the rubber is a sulfur curable rubber. Such diene-based elastomer, or rubber, may be selected, for example, from at least one of cis-1,4-polyisoprene rubber (natural and/or synthetic, and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35 percent to 50 percent vinyl), high vinyl polybutadiene rubber (50 percent to 75 percent vinyl), styrene/isoprene copolymers, emulsion polymerization prepared styrene/butadiene/acrylonitrile terpolymer rubber and butadiene/acrylonitrile copolymer rubber. An emulsion polymerization derived styrene/butadiene (E-SBR) might be used having a relatively conventional styrene content of 20 percent to 28 percent bound styrene or, for some applications, an E-SBR having a medium to relatively high bound styrene content, namely, a bound styrene content of 30 percent to 45 percent. Emulsion polymerization prepared styrene/butadiene/acrylonitrile terpolymer rubbers containing 2 to 40 weight percent bound acrylonitrile in the terpolymer are also contemplated as diene-based rubbers for use in this invention.

The solution polymerization prepared SBR (S-SBR) typically has a bound styrene content in a range of 5 to 50 percent, preferably 9 to 36 percent. Polybutadiene elastomer may be conveniently characterized, for example, by having at least a 90 weight percent cis-1,4-content.

Representative examples of suitable filler materials include metal oxides, such as silica (pyrogenic and precipitated), titanium dioxide, aluminosilicate and alumina; siliceous materials, such as clays and talc; and carbon black. Particulate, precipitated silica is also sometimes used for such purpose, particularly when the silica is used in connection with a silane. In some cases, a combination of silica and carbon black is utilized for reinforcing fillers for various rubber products, including treads for tires. Alumina can be used either alone or in combination with silica. The term "alumina" can be described herein as aluminum oxide, or $Al_2O_3$. The fillers may be hydrated or in anhydrous form. Use of alumina in rubber compositions can be shown, for example, in U.S. Pat. No. 5,116,886 and EP 631,982.

The blocked mercaptosilane may be premixed or prereacted with the filler particles or added to the rubber mix during the rubber and filler processing or mixing stage. If the silane and filler are added separately to the rubber mix during the rubber and filler mixing or processing stage, it is considered that the blocked mercaptosilane then combines in situ with the filler.

The vulcanized rubber composition should contain a sufficient amount of filler to contribute a reasonably high hardness and high resistance to tear. The combined weight of the filler may be as low as about 5 to 100 phr, but is more preferably from 25 phr to 85 phr.

Precipitated silicas are preferred as the primary filler. The silica may be characterized by having a BET surface area, as measured using nitrogen gas, preferably in the range of 40 to 600 $m^2/g$, and more usually in a range of 50 to 300 $m^2/g$. The silica typically may also be characterized by having a dibutylphthalate (DBP) absorption value in a range of 100 to 350, and more usually 150 to 300. Further, the silica, as well as the aforesaid alumina and aluminosilicate, may be expected to have a CTAB surface area in a range of 100 to 220. The CTAB surface area is the external surface area as evaluated by cetyl trimethylammonium bromide with a pH of 9. The method is described in ASTM D 3849.

Mercury porosity surface area is the specific surface area determined by mercury porosimetry. For such technique, mercury is penetrated into the pores of the sample after a thermal treatment to remove volatiles. Set up conditions may be suitably described as using a 100 mg sample, removing volatiles during two hours at 105° C. and ambient atmospheric pressure, ambient to 200 bars pressure measuring range. Such evaluation may be performed according to the method described by Winslow, Shapiro in ASTM bulletin, page 39 (1959) or according to DIN 66133. For such an evaluation, a CARLO-ERBA Porosimeter 2000 might be used. The average mercury porosity specific surface area for the silica should be in a range of 100 to 300 $m^2/g$.

A suitable pore size distribution for the silica, alumina, and aluminosilicate according to such mercury porosity evaluation is considered herein to be:

5 percent or less of its pores have a diameter of less than about 10 nm;

60 percent to 90 percent of its pores have a diameter of 10 to 100 nm;

10 percent to 30 percent of its pores have a diameter at 100 to 1,000 nm; and 5 percent to 20 percent of its pores have a diameter of greater than about 1,000 nm.

The silica might be expected to have an average ultimate particle size, for example, in the range of 0.01 to 0.05 :m as determined by the electron microscope, although the silica particles may be even smaller, or possibly larger, in size. Various commercially available silicas may be considered for use in this invention, such as, from PPG Industries under the HI-SIL trademark with designations HI-SIL 210, 243, etc.; silicas available from Rhone-Poulenc, with, for example, the designation of ZEOSIL 1165 MP; silicas available from Degussa with, for example, the designations VN2 and VN3, etc.; and silicas commercially available from Huber having, for example, the designation of HUBERSIL 8745.

Where it is desired for the rubber composition, which contains both a siliceous filler, such as silica, alumina and/or aluminosilicates, and also carbon black reinforcing pigments, to be primarily reinforced with silica as the reinforcing pigment, it is often preferable that the weight ratio of such siliceous fillers to carbon black is at least 3/1 and preferably at least 10/1 and, thus, in a range of 3/1 to 30/1. The filler may be comprised of 15 to 95 weight percent precipitated silica, alumina, and/or aluminosilicate and, correspondingly 5 to 85 weight percent carbon black, wherein the carbon black has a CTAB value in a range of 80 to 150. Alternatively, the filler can be comprised of 60 to 95 weight percent of said silica, alumina, and/or aluminosilicate and, correspondingly, 40 to 5 weight percent carbon black. The siliceous filler and carbon black may be pre-blended or blended together in the manufacture of the vulcanized rubber.

The rubber composition may be compounded by methods known in the rubber compounding art, such as mixing the various sulfur-vulcanizable constituent rubbers with various commonly used additive materials. Examples of such common used additive materials are curing aids, such as sulfur, activators, retarders and accelerators; processing additives, such as oils, resins including tackifying resins, silicas, plasticizers, fillers, pigments, fatty acid, zinc oxide, waxes, antioxidants and antiozonants, peptizing agents; and reinforcing materials, such as carbon black. Depending on the intended use of the sulfur vulcanizable and sulfur vulcanized material (rubbers), the additives mentioned above are selected and commonly used in conventional amounts.

The vulcanization may be conducted in the presence of an additional sulfur vulcanizing agent. Examples of suitable sulfur vulcanizing agents include, for example, elemental sulfur (free sulfur) or sulfur donating vulcanizing agents, for example, an amino disulfide, polymeric polysulfide or sulfur olefin adducts that are conventionally added in the final, productive, rubber composition mixing step. The sulfur vulcanizing agents, which are common in the art, are used, or added in the productive mixing stage, in an amount ranging from 0.4 to 3 phr, or even in some circumstances up to about 8 phr, with a range of 1.5 to 2.5 phr, sometimes 2 to 2.5 phr, being preferred.

Vulcanization accelerators, i.e., additional sulfur donors, may be used herein. It is appreciated that they may be, for example, of the type such as benzothiazole, alkyl thiuram disulfide, guanidine derivatives, and thiocarbamates. Examples of such accelerators include, but are not limited to, mercapto benzothiazole, tetramethyl thiuram disulfide, benzothiazole disulfide, disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methyl piperazine), dithiobis(N-$-hydroxy ethyl piperazine) and dithiobis (dibenzyl amine). Other additional sulfur donors, may be, for example, thiuram and morpholine derivatives. Examples of such donors include, but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, and disulfidecaprolactam.

Accelerators are used to control the time and/or temperature required for vulcanization and to improve the properties of the vulcanizate. In one embodiment, a single accelerator system may be used, i.e., a primary accelerator. Conventionally and preferably, the primary accelerator(s) is used in total amounts ranging from 0.5 to 4 phr, preferably 0.8 to 1.5 phr. Combinations of a primary and a secondary accelerator might be used with the secondary accelerator being used in smaller amounts (of 0.05 to 3 phr) in order to activate and to improve the properties of the vulcanizate. Delayed action accelerators may be used. Vulcanization retarders might also be used. Suitable types of accelerators are amines, disulfides, guanidines, thioureas, thiazoles, thiurams, sulfenamides, dithiocarbamates, and xanthates. Preferably, the primary accelerator is a sulfenamide. If a second accelerator is used, the secondary accelerator is preferably a guanidine, dithiocarbamate, or thiuram compound.

Typical amounts of tackifier resins, if used, comprise 0.5 to 10 phr, usually 1 to 5 phr. Typical amounts of processing aids comprise 1 to 50 phr. Examples of such processing aids include aromatic, naphthenic, and/or paraffinic processing oils. Typical amounts of antioxidants comprise 1 to 5 phr. Representative antioxidants may be, for example, diphenyl-p-phenylenediamine and others such as those disclosed in the *Vanderbilt Rubber Handbook* (1978), pages 344-46. Typical amounts of antiozonants comprise 1 to 5 phr. Typical amounts of fatty acids, which can include stearic acid, comprise 0.5 to 3 phr, if used. Typical amounts of zinc oxide comprise 2 to 5 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

The rubber composition of this invention can be used for various purposes. For example, it can be used for various tire compounds. Such tires can be built, shaped, molded, and cured by various methods, which are known and will be readily apparent to those having skill in such art.

All references cited are incorporated herein as they are relevant to the present invention.

The invention may be better understood by reference to the following examples in which the parts and percentages are by weight unless otherwise indicated.

EXAMPLES

Example A

Preparation of
3-(octanoylthio)-1-propyltriethoxysilane

Into a 12-liter, three-necked round bottom flask equipped with mechanical stirrer, addition funnel, thermocouple, heating mantle, $N_2$ inlet, and temperature controller were charged 1,021 grams of 3-mercaptopropyltriethoxysilane (SILQUEST® A-1891 silane from Crompton Corp.), 433 grams of triethylamine, and 3,000 mL of hexane. The solution was cooled in an ice bath, and 693 grams of octanoyl chloride were added over a two hour period via the addition funnel. After addition of the acid chloride was complete, the mixture was filtered two times, first through a 0.1 :m filter and then through a 0.01 :m filter, using a pressure filter to remove the salt. The solvent was removed under vacuum. The remaining yellow liquid was vacuum distilled to yield 1,349 grams of octanoylthiopropyltriethoxysilane as a clear, very light yellow liquid. The yield was 87 percent.

Example B

The model formulation used to mix silica with rubber is shown in Table 1. Mixing was done in a 1.6 liter "B" type Banbury with tangential rotors. Silquest A-1289 (TESPT) and Silquest A-1589 (TESPD) were chosen as controls. The silane loadings were adjusted so as to deliver equal moles of alkoxy groups to the silica.

TABLE 1

Silica-Silane/Rubber Formulation

| PHR | INGREDIENT |
|---|---|
| 103.2 | Solution SBR (Buna VSL 5525-1) - (Bayer AG) |
| 25 | BR (Budene 1207) - (Goodyear) |
| Variable | Silica - Zeosil 1165MP - (Rhodia) |
| Variable | A-1289 (TESPT)/A-1589 (TESPD/3-Octanoylthio-1-propyltriethoxysilane (NXT silane) |
| 5.0 | Oil - Sundex 8125 - (Sun Oil) |
| 2.5 | Zinc Oxide - Kadox 720C - (Zinc Corp.) |
| 1.0 | Stearic Acid - Industrene R - (Witco, Crompton) |
| 2.0 | 6 PPD[1] - Flexzone 7P - (Uniroyal, Crompton) |
| 1.5 | Wax - Sunproof Improved - (Uniroyal, Crompton) |
| Variable | Hardness modifiers (carbon black, fumed silica, and accelerators.) |
| | FINAL MIX INGREDIENTS |
| 1.46 | Rubbermakers Sulfur 104, Harwick |
| 1.7 | CBS[2] - Delac S (Uniroyal, Crompton) |
| 1. | DPG[3] - (Uniroyal, Crompton) |

[1]PPD is diphenyl-p-phenylenediamine.
[2]CBS is N-cyclohexyl-2-benzothiazole sulfenamide.
[3]DPG is di-phenyl guanidine.

The following is the procedure for two- and one-non-productive mix steps:

Two Pass Procedure

First Banbury Pass:

Cooling with water @ 25° C., 72% fill factor.
1. Add polymers, RDM (ram down mix) 30 seconds @ 117 RPM.
2. Add 50% silica, all silane, RDM 30 seconds.
3. Add remaining 50% silica, oil, RDM 30 seconds.
4. Dust down, RDM 20 seconds.
5. Dust down, RDM 20 seconds.
6. Dust down, RDM @ higher speeds to 160-170° C. (approximately 1 minute). Total time for first pass is approximately 5-6 minutes.
7. Dump, sheet off roll mill @ 50-60° C., cool below 60° C.

Second Banbury Pass:
1. Add compound from 1st pass, RDM 30 seconds @ 117 RPM.
2. Add remainder of ingredients, RDM 30 seconds.
3. Dust down, RDM to 160-170° C. (in approx. 2 minutes) by increasing rotor speed.
4. Hold at 170° C. (or higher temperature) for 8 minutes by changing speeds on mixer. Total time for second Banbury pass is approximately 11-12 minutes.
5. Dump, sheet off roll mill @ 50-60° C. to cool.

For the single pass procedure, combine the first and second passes of the two-pass mix sequence by going to step 2 of the second pass immediately after completing step 4 of the first pass. This eliminates the intermediate cooling step.

For the productive mix, add sulfur and accelerators (primary and secondary) into the above masterbatch on a two-roll mill at 50-60° C.

The controls, TESPT and TESPD, were mixed in two non-productive mix steps, which included an intermediate cooling step. The 3-octanoylthio-1-propyltriethoxysilane-containing compound was mixed in one step, without any intermediate cooling step.

After all silica, silane, and oil are incorporated into the mix, the rpm of the rotors is raised so as to achieve the desired silanization temperature. The mix is then held at that temperature for 8 minutes. For polysulfide silanes, a cooling step is needed before this silanization step, sometimes even multiple cooling steps. The 3-octanoylthio-1-propyltriethoxysilane eliminates this need. The mix procedures have been shown above. Curing and testing were done according to ASTM standards. In addition, small strain dynamic tests were carried out on a Rheometrics Dynamic Analyzer (ARES—Rheometrics Inc.).

Compound Testing Standards

| Mooney viscosity and scorch: | ASTM D1646 |
|---|---|
| Oscillating disc rheometer: | ASTM D2084 |
| Curing of test plaques: | ASTM D3182 |
| Stress-strain properties: | ASTM D412 |
| Heat build-up: | ASTM D623 |

Dynamic Mechanical Properties

Payne effect strain sweeps were carried out from dynamic strain amplitudes of 0.01% to about 25% shear strain amplitude at 10 Hz and 60° C. The dynamic parameters, $G'_{initial}$, $)G'$, $G''_{max}$, $\tan *_{max}$ were extracted from the non-linear responses of the rubber compounds at small strains. In some cases, steady state values of tan * were measured after 15 minutes of dynamic oscillations at strain amplitudes of 35% at 60° C. Temperature dependence of dynamic properties were also measured from about −80° C. to +80° C. at small strain amplitudes (1 or 2%) at a frequency of 10 Hz.

As seen from Example 1, the NXT silane compound exhibits lower Mooney viscosity, and decreased non-linearity (lower $G'$,$)G'$ and $\tan *_{max}$) compared to TESPD (tetrasulfide silane and TESPD (di-sulfide silane). While non-linearity and hysteresis at 60° C. are improved, the hardness of NXT silane-containing rubber compound is lower. Due to reduced filler-filler interactions, the modulus of NXT silane compound is reduced over the entire strain range. However, the coupling strength, as indicated by M300/M100, is in the range of polysulfide silanes. FIG. 1 shows temperature dependence of viscoelastic properties of these rubber compounds. Compared to the controls, NXT silane containing compound shows reduced tan * values at 60° C., and high tan * values in the +5 to −20° C. range. This is an indication that rubber compounds made with NXT silane will lead to tire treads with lower rolling resistance and better wet traction characteristics.

One way of increasing the hardness of the NXT silane compound is to reduce the amount of silane so as to increase filler-filler interactions (enhance thixotropy). Example 2 demonstrates this test with lower NXT silane loading levels. From the results of this experiment, in order to increase the hardness of NXT silane compound up to the levels of the TESPD compound, it would be necessary to reduce the NXT silane loading below 40% molar loading levels (below 3.9 phr in this formulation). At this loading of NXT silane, the filler-filler "structure" is comparable to that of TESPD compound—as indicated by the dynamic properties. However, the amount of silane delivered to couple the silica to rubber is insufficient. The low reinforcing properties of NXT silane compounds (NXT-6 and NXT-7) indicate this fact. From this experiment, it can be noted that reducing the NXT silane loading cannot improve the hardness of the compound without sacrificing the reinforcing properties.

In Example 3, the effect of sulfur loading in NXT silane compounds is studied. Polysulfide silanes (TESPT and TESPD) contain on an average more than one sulfur atom (average sulfur rank of TESPT is about ~3.7 and that of TESPD is ~2.2). During in-situ mixing, the relatively weak S—S linkage in polysulfide silanes might cleave. This can be triggered as the thermo-mechanical energy distribution in the rubber develops "hot spots". Under such conditions, free sulfur is released into the rubber compound, leading to premature scorch. While this scorching occurs, crosslinks are formed in the bulk rubber from the sulfur donated by the silanes. This additional cross-linking leads to an increased hardness of the rubber compound. NXT silane on the other hand does not show any premature scorching tendency. It has a higher thermo-mechanical threshold compared to polysulfide silanes. Following this direction, there may be a need to add extra sulfur into the rubber compound containing NXT silane so as to get optimal cross-link density network. The increased crosslink density also results in increase of hardness. With this idea, Example 3 investigates the effects of extra sulfur in the NXT silane compound. The extra sulfur is added in the productive mix step, along with the conventional vulcanization package (that also includes elemental sulfur). From the table of Example 3, it is observed that addition of extra sulfur does impact the hardness of NXT silane rubber compound. An additional 1.5 phr of elemental sulfur results in an increase of 4 points in hardness (Shore A hardness test). The objective of this experiment however is to bring the cross-link density of the NXT silane compound up to the levels of TESPD, and not to over cross-link the system. In that respect, an addition of 0.3 to 0.6 phr of extra sulfur to the NXT compound may bring the cross-link density to the optimum levels. Beyond 0.6 phr extra sulfur, the elongation at rupture of the rubber compound containing NXT silane is reduced drastically.

Other methods that follow a similar approach to increasing hardness of NXT silane compound include addition of certain accelerators. These accelerators (e.g. MBTS—bis mercapto-benzo-thiozole, arazates-zinc dibutyldithiocarbamate) increase the speed of vulcanization and lead to a higher equilibrium modulus in the final fully cured state. The hardness increase with these accelerators occurs via modification of the cross-link density of the system. It can be noted from Examples 4 and 5 that even small addition of the accelerators result in substantial changes in the rubber compound. With increased accelerator loading, the modulus values rise sharply and the elongation at rupture of the compounds decreases rapidly. Compared to zinc dibutyldithiocarbamate, MBTS results in hardness improvements with less damage on the ultimate properties.

These methods of hardness improvement via cross-link structure modification offer a limited solution to the problem. They can only be used to adjust the cross-link density of the NXT silane compound and bring it up to the levels of TESPD and TESPT. While doing so, a part of the hardness difference between NXT and polysulfide compounds will be reduced. Any further increase in hardness via these routes (added sulfur or accelerators) may cause deleterious effects on the NXT silane compound. Therefore other neutral methods that follow hydrodynamic/thixotropic/bound rubber routes should be followed to improve the hardness of NXT compound up to the levels of controls.

Examples 6, 7 and 8 illustrate the improvement of hardness in NXT silane compounds via addition of carbon black. The mechanism of hardness increase in this case is thought to be hydrodynamic in nature and/or via formation of bound rubber. While addition of carbon black leads to an increase in hardness, due to the interactions of polymer chains with the surface of carbon-black, new hysteresis sources are generated in the compound. This causes an increased non-linearity under small strains that also result in an increase tan $*_{max}$ (indication of higher rolling resistance). In the case of Example 6 (additions of N-330), tan$d_{max}$ value for NXT compound without any modification is 0.11, and in the case of control-TESPD it is 0.21. Upon addition of 4 and 8 phr of N-330 into the NXT compound (NXT-17 and NXT-18 respectively), the tan $*_{max}$ values are 0.16 and 0.17. With 8 parts of added N-330, the hardness of the NXT compound is 58. In Example 7, an addition of 8 phr of N-234 leads to an increase in hardness of NXT compound up to 61 (same hardness as TESPD compound). In this case again, tan $*_{max}$ value is 0.16. Similarly, the hardness of NXT compound is increased up to the level of TESPD compound by addition of 8 phr of N-121 (Example 8). With some sacrifices in the hysteresis advantages at 60° C., addition of carbon black offers a relatively easy solution the problem. As would be expected, from comparison of a low structure carbon black (N-330) to a relatively high structure carbon black (N-121), it is indicative that higher structure carbon black would be more effective in hardness improvement. If it were preferred to use lower structure carbon black, more parts of the low structure carbon black would be needed to achieve the same amount of hardness increase. This method of hardness adjustment can be termed, as a partly neutral way of adjusting the hardness since it has minimal influence on the cross-link network structure, and it leads to an increase in hysteresis.

Figure 2:
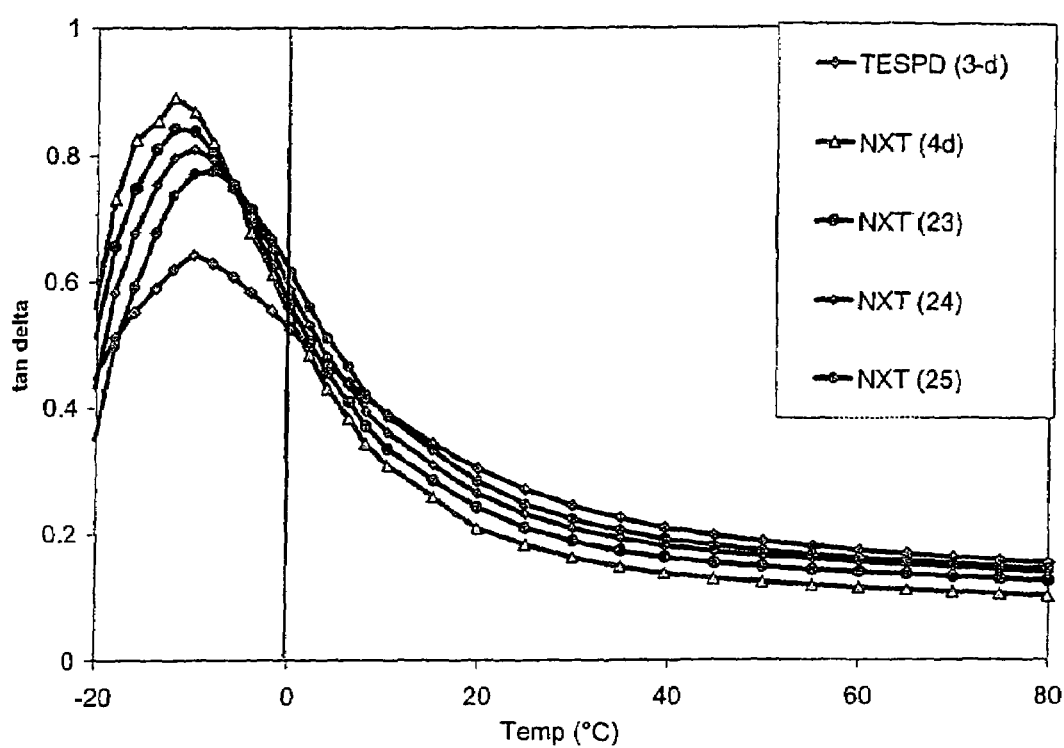
FIG. 2 is a graph depicting the effect of high silica loading on viscoelastic response of NXT compounds.
Figure 3:
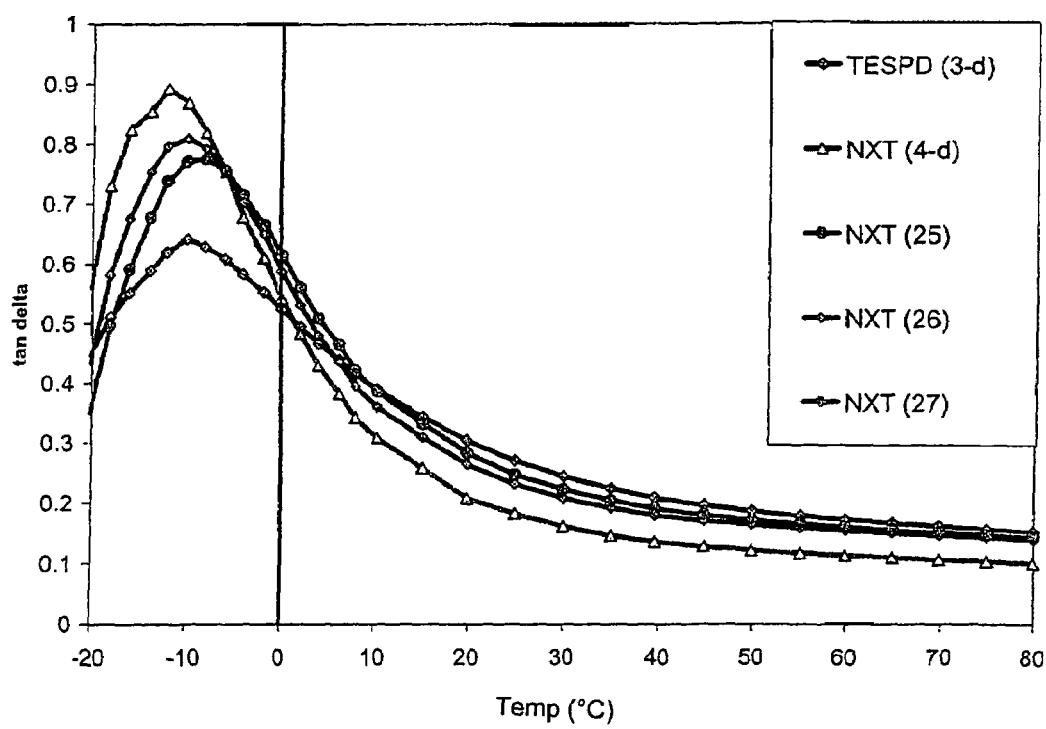
FIG. 3 is a graph depicting the viscoelastic response as a function of mixing variations with 100 phr silica loaded NXT compounds.
Figure 4:
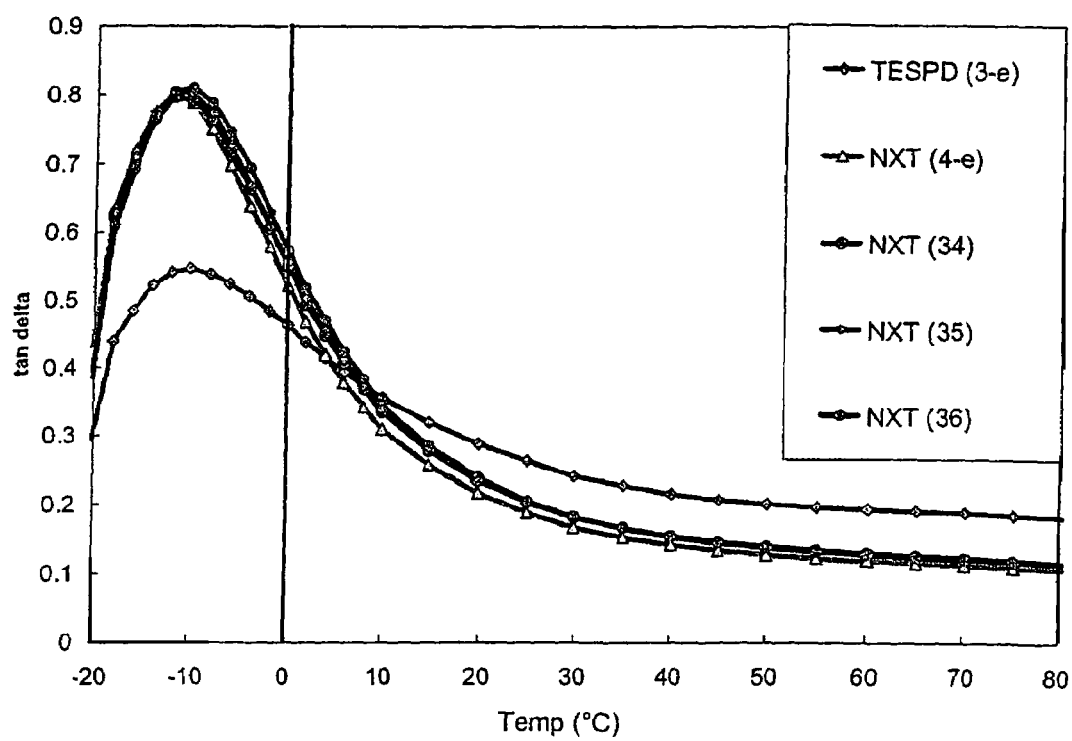
FIG. 4 is a graph depicting the effect of CAB-O-SIL M5 on the viscoelastic response of NXT compounds.
Figure 5:
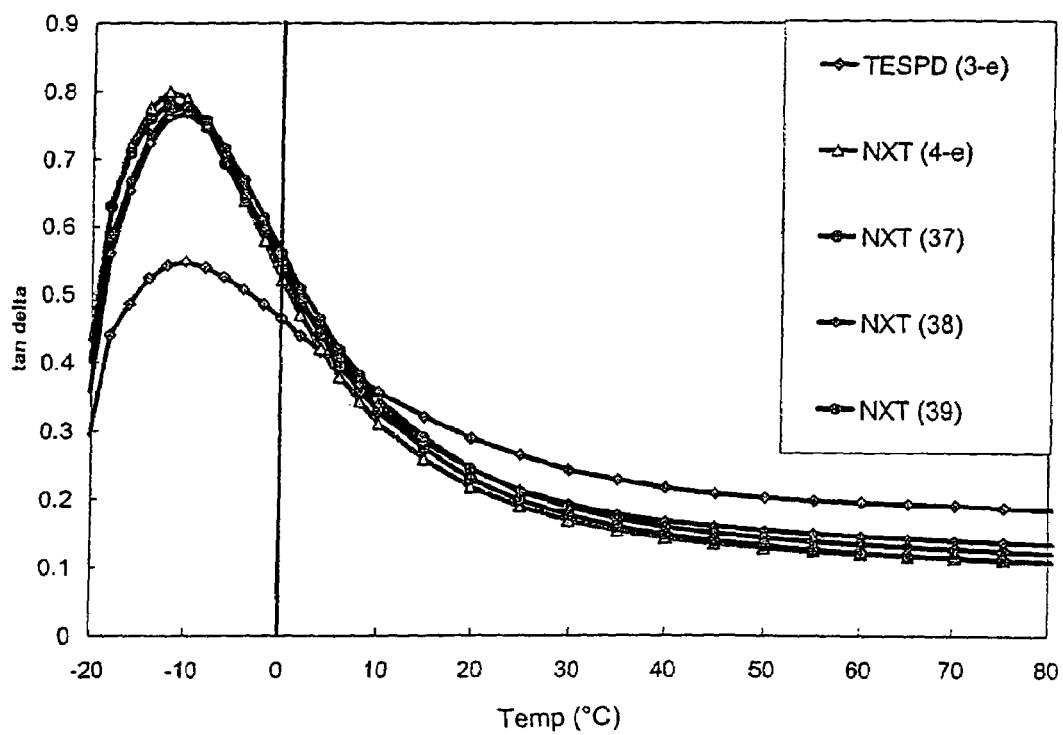
FIG. 5 is a graph depicting the effect of CAB-O-SIL TS-530 on the viscoelastic response of NXT compounds.
Figure 6:
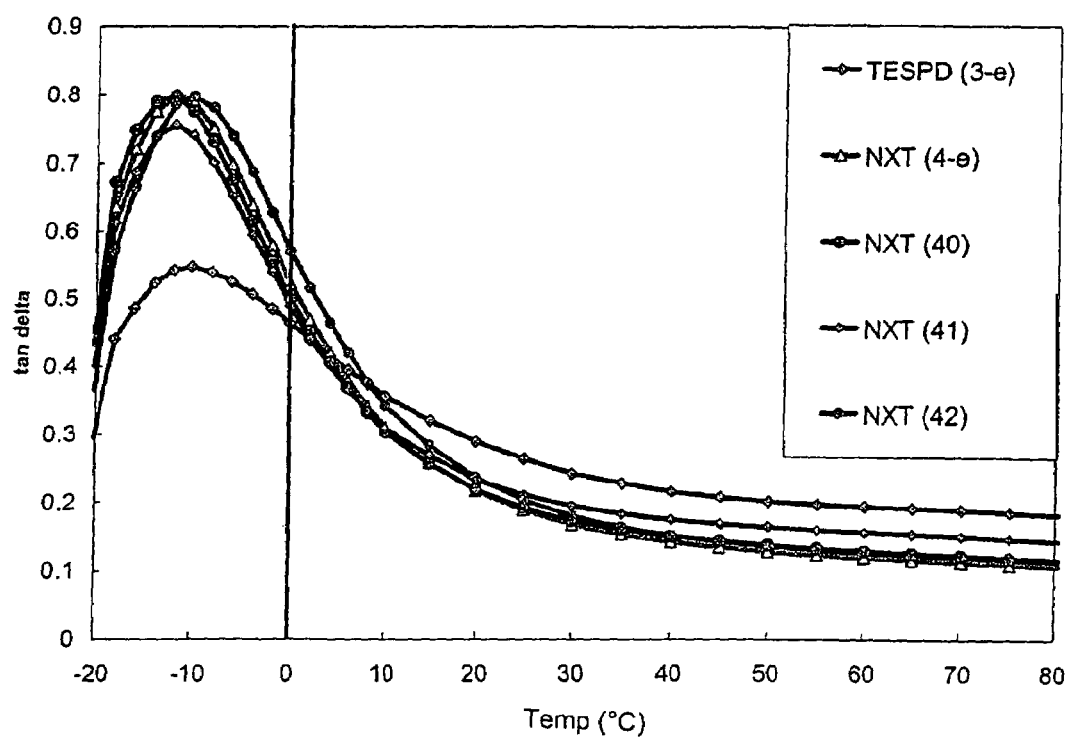
FIG. 6 is a graph depicting the effect of CAB-O-SIL TS-610 on the viscoelastic response of NXT compounds

Examples 9 through 12 and FIGS. 2 and 3 display results obtained with NXT silane compounds wherein an attempt was made to improve the hardness of the compound by increasing the loading of precipitated silica in the formulation. In Example 9, the control TESPD (3-d) and NXT (4-d) contain 80 phr of precipitated silica. Compounding variations NXT(23), NXT(24), and NXT (25) contain 90, 95, and 100 phr of silica. With increasing silica content, it can be seen that the hardness of the NXT compound increases. At 100 phr silica loading, the hardness of the NXT compound is already higher than the control (TESPD). At this silica level, the value of tan $*_{max}$ for NXT (25) is 0.17 (as against 0.20 for TESPD). This implies that high temperature hysteresis properties at 100 phr silica loaded NXT compound will be slightly better than the control TESPD with 80 phr silica loading. The tan $*_{max}$ values with NXT silane compounds become comparable with TESPD compound only at silica loading of 110 phr. This is not very surprising, since NXT silane is expected to improve the dispersion of silica. One more advantageous feature of increasing the silica loading is the positive shift in high and low temperature hysteresis. FIG. 2 indicates that with increasing silica content, the tan * values near 0° C. improve progressively with added silica. At 100 phr silica, the NXT compound not only shows equal hardness with better tan $*_{max}$ at 60° C. compared to TESPD, but also a substantial improvement in low temperature hysteresis. This increase in tan * values near 0° C. indicates enhanced wet traction properties with NXT compounds. The viscosity of NXT compound at 100 phr loading is close to that of the TESPD compound. The reinforcement level (M300/100) with 100 phr silica in the NXT compound is higher than the control indicating superior coupling strength. The NXT compounds cited in Example 9 were mixed in two non-productive mix steps. Also, the loading levels were kept at 9.7 phr (which is the molar equivalent of 6.2 phr of TESPD in an 80 phr silica loaded formulation). Example 10 shows results of comparison of NXT compound with 100 phr silica mixed in both, two and one non-productive mix steps. It also examines the effect of increased NXT silane loading level to compensate for any deterioration in coupling strength. From the results, it is observed that mixing NXT rubber compounds containing 100 phr silica in one non-productive step leads to an equivalent set of physical properties (with some improvements in reinforcing properties). The dosage level increase from 9.7 to 10.9 phr of NXT provides some benefits to the compound. These experiments on high silica clearly demonstrate the expansion of the performance envelope of rubber compounds (Rolling Resistance-Traction) with NXT silane. With high silica loadings, NXT silane shows the potential to provide equal hardness, slightly better rolling resistance, and substantially enhanced wet traction when compared to TESPT and TESPD silanes.

Examples 13-16 describe experiments of hardness adjustment in NXT silane compounds via addition of fumed silica. Fumed (pyrogenic) silica, with a relatively low concentration of silanols on its surface offers a good solution (closer to purely hydrodynamic) to the hardness problem. In these experiments, the fumed silicas used were of the type:

CAB-O-SIL M5 (200±25 m$^2$/g)—Untreated

CAB-O-SIL TS-530 (base silica HS-5 with surface area 325±25 m$^2$/g)

Treated with Hexamethyldisilazane

CAB-O-SIL TS-610 (base silica LM-130 with surface area 130±15 m$^2$/g)

Treated with Dimethyldichlorosilane, and

CAB-O-SIL TS-720 (base silica M-5 with surface area 200±25 m$^2$/g)

Treated with Polydimethylsiloxane.

From Examples 13-16, it can be seen that with increasing addition of fumed silicas, NXT compound shows proportionate increases in hardness. The highest loading of fumed silica in the examples (8 phr) is not enough to match the hardness of the NXT compounds with those of TESPD. In this case, addition of about 5-8 phr fumed silica (in total 13-16 phr) may be necessary to raise the NXT compound hardness to 61 points. Compared to carbon black and precipitated silicas, fumed silica additions cause relatively less increase in hysteresis at high temperatures (tan $*_{max}$ at 60° C.). Furthermore, it should also be noted that fumed silicas CAB-O-SIL M-5 and CAB-O-SIL TS-530 additions lead to an increase in tan d values near 0° C. This is an indication of expansion of the performance envelope of NXT compounds, i.e., minimal sacrifice in high temperature hysteresis (indicating better rolling resistance) and an improvement in low temperature hysteresis (indicating improved traction properties). As expected, addition of fumed silica also causes an increase in Mooney viscosities. With the addition of fumed silicas, the reinforcing properties are not affected negatively.

Examples 17-20 demonstrate the use of MQ resins in NXT silane compounds. The M groups in these MQ resins can be described as having the structure $R^1R^2R^3SiO_{1/2}$, wherein $R^1$, $R^2$, and $R^3$ are methyl groups. MQ resin was added to the rubber compound along with NXT silane (2:1, 1:1, and 3:1 mixtures of MQ/NXT silane). In Example 17, MQ is mixed with NXT silane in a 2:1 ratio by weight, and then added to the rubber compound. The effective loading of NXT silane is kept at 8.2 phr, while the effective loadings of MQ are varied, 16.4, 12.0, 8.0, 4.0, and 2.0 phr, respectively. It is easily seen that MQ loadings of 4 phr and higher provide the necessary hardness increase to the NXT compound. From the example table, it is also easily observed that, with the addition of MQ resin, not only is the hardness increase observed, but at the same time, a favorable balance between hysteresis properties at 60° C. and 0° C. (as indicated by tan $*_{max}$ and tan $*|0°$ C.) can be maintained. Due to the incorporation of MQ siloxane into the rubber compound, the modulus values at low strains increase, whereas the modulus values at high strains are similar to those of the TESPD compound. The use of MQ resins does not cause any detrimental effects on the ability to mix NXT silane in reduced mixing steps and at higher mixing temperatures.

In Example 18, MQ is mixed with NXT silane in a 1:1 ratio by weight, and then added to the rubber compound. The effective loading of NXT silane is kept at 8.2 phr, while the effective loadings of MQ are varied, 8.2, 6.0, 4.0, and 2.0 phr, respectively. It is easily seen that MQ loadings of 4 phr and higher provide the necessary hardness increase to the NXT compound. From the example table it is also easily observed that, with the addition of MQ resin, not only the hardness increase is observed, but, at the same time, a favorable balance between hysteresis properties at 60° C. and 0° C. (as indicated by tan $*_{max}$ and tan $*|0°$ C.) can be maintained. Due to the incorporation of MQ siloxane into the rubber compound, the modulus values at low strains increase, whereas the modulus values at high strains are similar to those of the TESPD compound. The use of MQ resins does not cause any detrimental effects on the ability to mix NXT silane in reduced mixing steps and at higher mixing temperatures.

In Example 19, MQ is mixed with NXT silane in a 3:1 ratio by weight, and then added to the rubber compound. The effective loading of NXT silane is kept at 8.2 phr, while the effective loadings of MQ are varied, 14.9 and 8.0 phr, respectively. It is easily noticed that MQ loadings of 8 phr and higher provide the necessary hardness increase to the NXT compound. From the example table it is also easily observed that, with the addition of MQ resin, not only the hardness increase is observed, but, at the same time, a favorable balance between hysteresis properties at can be maintained. Due to the incorporation of MQ siloxane into the rubber compound, the modulus values at low strains increase, whereas the modulus values at high strains are similar to those of the TESPD compound. The use of MQ resins does not cause any detrimental effects on the ability to mix NXT silane in reduced mixing steps and at higher mixing temperatures.

In Example 20, the best performing MQ:NXT mixtures from examples 17, 18, and 19 are compared with NXT compounds wherein hardness re-formulation is achieved via addition of precipitated and fumed silica. From the example table, it is evident that MQ resins when added to the NXT rubber compounds provide a substantial benefit of improved hardness, while maximizing the performance balance between hysteresis properties at 60° C. and 0° C. (as indicated by tan $*_{max}$ and tan $*|0°$ C.), and cause the least amount of viscosity increase in the rubber compound. The enhancement of NXT compound performance with MQ resins is more neutral when compared to the enhancement of performance via using higher amounts of precipitated silica or by addition of fumed silica to the compound. The use of MQ resins does not cause any detrimental effects on the ability to mix NXT silane in reduced mixing steps and at higher mixing temperatures.

Example 1

Comparison of Controls and NXT Silane Compounds

| Ingredient (phr) | No-Silane (1) | TESPT (2) | TESPD (3a) | NXT (4a) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPT | — | 7.0 | | |

-continued

| Ingredient (phr) | No-Silane (1) | TESPT (2) | TESPD (3a) | NXT (4a) |
|---|---|---|---|---|
| TESPD | | | 6.2 | |
| NXT Silane | | | | 9.7 |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 1 | 2 | 2 | 1 |
| Mixing temperature | 160° C. | 160° C. | 160° C. | 170° C. |

| Compound properties | No-Silane (1) | TESPT (2) | TESPD (3a) | NXT (4a) |
|---|---|---|---|---|
| Processing | | | | |
| Mooney Viscosity | 116 | 69 | 65 | 52 |
| Scorch time (min) | 8.3 | 8.3 | 11.3 | 13.0 |
| Cure time t90 (min) | 17.5 | 20.2 | 17.1 | 15.1 |
| $M_L$ (dNm) | — | 10.9 | 9.3 | 7.1 |
| $M_H$ (dNm) | 45.3 | 33.6 | 29.9 | 27.9 |
| Properties in the cured state | | | | |
| Non-linearity (0-10%) @ 60° C. | | | | |
| $G'_{initial}$ (MPa) | 8.30 | 2.30 | 2.70 | 1.46 |
| $\Delta G'$ (MPa) | 5.00 | 0.86 | 1.26 | 0.35 |
| $G''_{max}$ (MPa) | 1.14 | 0.25 | 0.36 | 0.14 |
| $\tan\delta_{max}$ | 0.23 | 0.15 | 0.20 | 0.11 |
| $\tan\delta\,|_{35\%\,DSA}$ | 0.22 | 0.13 | 0.16 | 0.10 |
| Wet-Skid Indicator, 10 Hz, 1% DSA | | | | |
| $\tan\delta\,|0°$ C. | 0.40 | 0.497 | 0.524 | 0.543 |

-continued

| Compound properties | No-Silane (1) | TESPT (2) | TESPD (3a) | NXT (4a) |
|---|---|---|---|---|
| Reinforcement | | | | |
| Hardness (Shore A) | 64.0 | 59.0 | 59.0 | 53.0 |
| M 25% (MPa) | — | 0.89 | 0.83 | 0.78 |
| M 100% (MPa) | 2.1 | 2.23 | 1.72 | 1.69 |
| M 300% (MPa) | 3 | 14.38 | 9.64 | 10.2 |
| M 300%/M100% | 1.4 | 6.5 | 5.6 | 6.0 |
| Elongation at rupture (%) | 900.0 | 415.0 | 531.0 | 536.0 |
| Stress at rupture (MPa) | 11.7 | 22.8 | 23.9 | 24.1 |

Example 2

Effect of Silane Loading on Hardness of NXT Compounds

| Ingredient (phr) | NXT (4a) | NXT (5) | NXT (6) | NXT (7) | TESPD (3a) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 80.0 | 80.0 | 80.0 | 80.0 |
| TESPD | | | | | 6.2 (100%) |
| NXT Silone | 9.7 (100%) | 7.8 (80%) | 3.9 (40%) | 1.9 (20%) | |
| Aromatic Oil | 5.0 | 5.0 | 5.0 | 5.0 | 5.0 |
| Zinc Oxide | 2.5 | 2.5 | 2.5 | 2.5 | 2.5 |
| Stearic add | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 1 | 1 | 1 | 1 | 2 |
| Mixing temperature | 170° C. | 170° C. | 170° C. | 170° C. | 160° C. |

| Compound properties | NXT (4a) | NXT (5) | NXT (6) | NXT (7) | TESPD (3a) |
|---|---|---|---|---|---|
| Processing | | | | | |
| Mooney Viscosity | 52 | 55 | 61 | 76 | 65 |
| Scorch time (min) | 13.0 | 14.3 | 11.4 | 9.4 | 11.3 |
| Cure time t90 (min) | 15.1 | 18.1 | 25.3 | 18.2 | 17.1 |
| $M_L$ (dNm) | 7.1 | 7.4 | 8.3 | — | 9.3 |
| $M_H$ (dNm) | 27.9 | 27.2 | 25.3 | 37.1 | 29.9 |
| Properties in the cured state | | | | | |
| Non-linearity (0-10%) | | | | | |
| $G'_{initial}$ (MPa) | 1.46 | 1.74 | 2.24 | 4.65 | 2.70 |
| $\Delta G'$ (MPa) | 0.35 | 0.55 | 0.87 | 2.65 | 1.26 |
| $G''_{max}$ (MPa) | 0.14 | 0.18 | 0.28 | 0.62 | 0.36 |
| $\tan\delta_{max}$ | 0.11 | 0.13 | 0.16 | 0.21 | 0.20 |
| $\tan\delta|_{35\%}$ DSA | 0.099 | 0.109 | 0.146 | 0.182 | 0.159 |
| Reinforcement | | | | | |
| Hardness (Shore A) | 53 | 52 | 54 | 63 | 59 |
| M 25% (MPa) | 0.78 | 0.79 | 0.76 | 0.9 | 0.83 |
| M 100% (MPa) | 1.69 | 1.71 | 1.51 | 1.52 | 1.72 |
| M 300% (MPa) | 10.2 | 10.23 | 7.85 | 6.54 | 9.64 |
| M 300%/M100% | 6.0 | 6.0 | 5.2 | 4.3 | 5.6 |
| Elongation at rupture (%) | 536.0 | 513.0 | 559.0 | 608.0 | 531.0 |
| Stress at rupture (MPa) | 24.1 | 22.9 | 21.6 | 19.1 | 23.9 |

Example 3

Effect of Sulfur Loading on Hardness of NXT Compounds

| Ingredient (phr) | NXT (4a) | NXT (8) | NXT (9) | NXT (10) | TESPD (3a) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 80.0 | 80.0 | 80.0 | 80.0 |
| TESPD | — | — | — | — | 6.2 |
| NXT Silane | 9.7 | 9.7 | 9.7 | 9.7 | — |
| Aromatic Oil | 5.0 | 5.0 | 5.0 | 5.0 | 5.0 |
| Zinc Oxide | 2.5 | 2.5 | 2.5 | 2.5 | 2.5 |
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| Sulfur | 1.4 | 2.0 | 2.5 | 3.0 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 1 | 1 | 1 | 1 | 2 |
| Mixing temperature | 170° C. | 170° C. | 170° C. | 170° C. | 160° C. |

| Compound properties | NXT (4a) | NXT (8) | NXT (9) | NXT (10) | TESPD (3a) |
|---|---|---|---|---|---|
| Processing | | | | | |
| Mooney Viscosity | 52 | 51 | 51 | 51 | 65 |
| Scorch time (min) | 13.0 | 11.4 | 11.1 | 10.4 | 11.3 |
| Cure time t90 (min) | 15.1 | 13.2 | 14.6 | 15.4 | 17.1 |
| $M_L$ (dNm) | 7.1 | 7.3 | 7.2 | 7.1 | 9.3 |
| $M_H$ (dNm) | 27.9 | 31.5 | 34.0 | 36.1 | 29.9 |
| Properties in the cured state | | | | | |
| Non-linearity (0-10%) | | | | | |
| $G'_{initial}$ (MPa) | 1.46 | 1.70 | 2.05 | 1.80 | 2.70 |
| $\Delta G'$ (MPa) | 0.35 | 0.50 | 0.73 | 0.51 | 1.26 |
| $G''_{max}$ (MPa) | 0.14 | 0.16 | 0.17 | 0.15 | 0.36 |
| $\tan\delta_{max}$ | 0.11 | 0.11 | 0.11 | 0.11 | 0.20 |
| $\tan\delta \mid_{35\% DSA}$ | 0.099 | 0.093 | 0.080 | 0.076 | 0.159 |
| Reinforcement | | | | | |
| Hardness (Shore A) | 53 | 54 | 56 | 57 | 59 |
| M 25% (MPa) | 0.78 | 0.84 | 0.87 | 0.92 | 0.83 |
| M 100% (MPa) | 1.69 | 2.01 | 2.33 | 2.59 | 1.72 |
| M 300% (MPa) | 10.2 | 12.92 | 15.14 | 16.18 | 9.64 |
| M 300%/M100% | 6.0 | 6.4 | 6.5 | 6.3 | 5.6 |
| Elongation at rupture (%) | 536.0 | 463.0 | 410.0 | 369.0 | 531.0 |
| Stress at rupture (MPa) | 24.1 | 23.5 | 22.6 | 21.2 | 23.9 |

Example 4

Effect of MBTS on Hardness of NXT Compounds

| Ingredient (phr) | NXT (4-b) | NXT (11) | NXT (12) | TESPD (3-b) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | — | — | — | 6.2 |
| NXT Silane | 9.7 | 9.7 | 9.7 | — |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| MBTS | — | 0.6 | 1.4 | — |
| No. of Mixing steps | 1 | 1 | 1 | 2 |
| Mixing temperature | 170° C. | 170° C. | 170° C. | 160° C. |

| Compound properties | NXT (4-b) | NXT (11) | NXT (12) | TESPD (3-b) |
|---|---|---|---|---|
| Processing | | | | |
| Mooney Viscosity | 54 | 53 | 54 | 66 |
| Scorch time (min) | 15.4 | 12.1 | 10.5 | 12.4 |
| Cure time t90 (min) | 16.2 | 12.5 | 13.3 | 19.2 |
| $M_L$ (dNm) | 7.0 | 6.9 | 6.8 | 9.4 |
| $M_H$ (dNm) | 27.7 | 31.5 | 33.8 | 31.5 |
| Properties in the cured state | | | | |
| Non-linearity (0-10%) | | | | |
| $G'_{initial}$ (MPa) | 1.80 | 1.75 | 2.08 | 2.97 |
| $\Delta G'$ (MPa) | 0.58 | 0.49 | 0.68 | 1.39 |
| $G''_{max}$ (MPa) | 0.19 | 0.15 | 0.18 | 0.40 |
| $\tan\delta_{max}$ | 0.13 | 0.11 | 0.11 | 0.20 |
| $\tan\delta \mid_{35\% DSA}$ | 0.110 | 0.085 | 0.081 | 0.156 |
| Reinforcement | | | | |
| Hardness (Shore A) | 55 | 57 | 58 | 62 |
| M 25% (MPa) | 0.709 | 0.85 | 0.895 | 0.875 |
| M 100% (MPa) | 1.68 | 2.19 | 2.569 | 1.94 |
| M 300% (MPa) | 9.928 | 13.166 | 15.81 | 11.04 |
| M 300%/M100% | 5.9 | 6.0 | 6.2 | 5.7 |
| Elongation at rupture (%) | 555.0 | 471.0 | 394.0 | 511.0 |
| Stress at rupture (MPa) | 23.9 | 22.3 | 22.9 | 23.5 |

Example 5

Effect of Arazate (Zincdibutyldithiocarbamate) on Hardness of NXT Compounds

| Ingredient (phr) | NXT (4-b) | NXT (13) | NXT (14) | TESPD (3-b) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | — | — | — | 6.2 |
| NXT Silane | 9.7 | 9.7 | 9.7 | — |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| Arazate | — | 0.6 | 1.4 | — |
| No. of Mixing steps | 1 | 1 | 1 | 2 |
| Mixing temperature | 170° C. | 170° C. | 170° C. | 160° C. |

| Compound properties | NXT (4-b) | NXT (13) | NXT (14) | TESPD (3-b) |
|---|---|---|---|---|
| Processing | | | | |
| Mooney Viscosity | 54 | 54 | 54 | 66 |
| Scorch time (min) | 15.4 | 7.2 | 4.0 | 12.4 |
| Cure time t90 (min) | 16.2 | 6.6 | 4.2 | 19.2 |
| $M_L$ (dNm) | 7.0 | 7.2 | 7.5 | 9.4 |
| $M_H$ (dNm) | 27.7 | 31.1 | 31.9 | 31.5 |
| Properties in the cured state | | | | |
| Non-linearity (0-10%) | | | | |
| $G'_{initial}$ (MPa) | 1.80 | 1.93 | 1.80 | 2.97 |
| $\Delta G'$ (MPa) | 0.58 | 0.58 | 0.50 | 1.39 |
| $G''_{max}$ (MPa) | 0.19 | 0.17 | 0.16 | 0.40 |
| $\tan\delta_{max}$ | 0.13 | 0.11 | 0.11 | 0.20 |
| $\tan\delta \mid_{35\% DSA}$ | 0.110 | 0.083 | 0.076 | 0.156 |
| Reinforcement | | | | |
| Hardness (Shore A) | 55 | 56 | 56 | 62 |
| M 25% (MPa) | 0.709 | 0.88 | 0.88 | 0.875 |
| M 100% (MPa) | 1.68 | 2.33 | 2.67 | 1.94 |
| M 300% (MPa) | 9.928 | 14.33 | 13.26 | 11.04 |
| M 300%/M100% | 5.9 | 6.1 | 5.0 | 5.7 |
| Elongation at rupture (%) | 555.0 | 312.0 | 297.0 | 511.0 |
| Stress at rupture (MPa) | 23.9 | 14.8 | 15.7 | 23.5 |

Example 6

Effect of N-330 on Hardness of NXT Compounds

| Ingredient (phr) | NXT (4-c) | NXT (17) | NXT (18) | TESPD (3-c) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | | | | 6.2 |
| NXT Silane | 9.7 | 9.7 | 9.7 | |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 7.0 | 11.0 | 3.0 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 1 | 1 | 1 | 2 |
| Mixing temperature | 170° C. | 170° C. | 170° C. | 160° C. |

| Compound properties | NXT (4-c) | NXT (17) | NXT (18) | TESPD (3-c) |
|---|---|---|---|---|
| Processing | | | | |
| Mooney Viscosity | 56 | 57 | 61 | 68 |
| Scorch time (min) | 10.3 | 9.0 | 7.4 | 9.6 |
| Cure time t90 (min) | 12.6 | 11.5 | 10.5 | 18.2 |
| $M_L$ (dNm) | 6.8 | 6.8 | 7.2 | 8.4 |
| $M_H$ (dNm) | 26.8 | 27.4 | 28.6 | 29.1 |
| Properties in the cured state | | | | |
| Non-linearity (0-10%) | | | | |
| $G'_{initial}$ (MPa) | 1.75 | 3.62 | 3.29 | 4.64 |
| $\Delta G'$ (MPa) | 0.41 | 1.86 | 1.56 | 2.80 |
| $G''_{max}$ (MPa) | 0.17 | 0.38 | 0.38 | 0.56 |
| $\tan\delta_{max}$ | 0.11 | 0.16 | 0.17 | 0.21 |
| Reinforcement | | | | |
| Hardness (Shore A) | 55 | 56 | 58 | 61 |
| M 25% (MPa) | 0.82 | 0.83 | 0.88 | 0.85 |
| M 100% (MPa) | 1.94 | 2 | 2.28 | 1.87 |
| M 300% (MPa) | 10.91 | 11.58 | 12.95 | 9.94 |
| M 300%/M100% | 5.6 | 5.8 | 5.7 | 5.3 |
| Elongation at rupture (%) | 530.0 | 510.0 | 450.0 | 520.0 |
| Stress at rupture (MPa) | 23.4 | 23.1 | 25.5 | 22.2 |
| Heat Build up (° C.) | +17 | +18 | +17 | +23 |

Example 7

Effect of N-234 on Hardness of NXT Compounds

| Ingredient (phr) | NXT (4-c) | NXT (19) | NXT (20) | TESPD (3-c) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | | | | 6.2 |
| NXT Silane | 9.7 | 9.7 | 9.7 | |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 3.0 | 3.0 | 3.0 |
| N-234 | — | 4.0 | 8.0 | — |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 1 | 1 | 1 | 2 |
| Mixing temperature | 170° C. | 170° C. | 170° C. | 160° C. |

| Compound properties | NXT (4-c) | NXT (19) | NXT (20) | TESPD (3-c) |
|---|---|---|---|---|
| Processing | | | | |
| Mooney Viscosity | 56 | 58 | 64 | 68 |
| Scorch time (min) | 10.3 | 8.1 | 7.0 | 9.6 |
| Cure time t90 (min) | 12.6 | 11.3 | 10.4 | 18.2 |
| $M_L$ (dNm) | 6.8 | 6.8 | 7.6 | 8.4 |
| $M_H$ (dNm) | 26.8 | 27.6 | 29.0 | 29.1 |
| Properties in the cured state | | | | |
| Non-linearity (0-10%) | | | | |
| $G'_{initial}$ (MPa) | 1.75 | 3.95 | 3.58 | 4.64 |
| $\Delta G'$ (MPa) | 0.41 | 2.10 | 1.78 | 2.80 |
| $G''_{max}$ (MPa) | 0.17 | 0.43 | 0.38 | 0.56 |
| $\tan\delta_{max}$ | 0.11 | 0.15 | 0.16 | 0.21 |
| Reinforcement | | | | |
| Hardness (Shore A) | 55 | 57 | 61 | 61 |
| M 25% (MPa) | 0.82 | 0.85 | 0.93 | 0.85 |
| M 100% (MPa) | 1.94 | 2.09 | 2.3 | 1.87 |
| M 300% (MPa) | 10.91 | 11.59 | 12.3 | 9.94 |
| M 300%/M100% | 5.6 | 5.5 | 5.3 | 5.3 |
| Elongation at rupture (%) | 530.0 | 510.0 | 460.0 | 520.0 |
| Stress at rupture (MPa) | 23.4 | 23.0 | 20.7 | 22.2 |
| Heat Build up (° C.) | +17 | +19 | +17 | +23 |

Example 8

Effect of N-121 on Hardness of NXT Compounds

| Ingredient (phr) | NXT (4-c) | NXT (21) | NXT (22) | TESPD (3-c) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | | | | 6.2 |
| NXT Silane | 9.7 | 9.7 | 9.7 | |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 3.0 | 3.0 | 3.0 |
| N-121 | — | 4.0 | 8.0 | — |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 1 | 1 | 1 | 2 |
| Mixing temperature | 170° C. | 170° C. | 170° C. | 160° C. |

| Compound properties | NXT (4-c) | NXT (21) | NXT (22) | TESPD (3-c) |
|---|---|---|---|---|
| Processing | | | | |
| Mooney Viscosity | 56 | 61 | 64 | 68 |
| Scorch time (min) | 10.3 | 8.1 | 7.0 | 9.6 |
| Cure time t90 (min) | 12.6 | 11.2 | 10.2 | 18.2 |
| $M_L$ (dNm) | 6.8 | 7.1 | 7.3 | 8.4 |
| $M_H$ (dNm) | 26.8 | 28.3 | 29.3 | 29.1 |
| Properties in the cured state | | | | |
| Non-linearity (0-10%) | | | | |
| $G'_{initial}$ (MPa) | 1.75 | 3.20 | 3.70 | 4.64 |
| $\Delta G'$ (MPa) | 0.41 | 1.52 | 1.80 | 2.80 |
| $G''_{max}$ (MPa) | 0.17 | 0.38 | 0.41 | 0.56 |
| $\tan\delta_{max}$ | 0.11 | 0.18 | 0.16 | 0.21 |
| Reinforcement | | | | |
| Hardness (Shore A) | 55 | 58 | 61 | 61 |
| M 25% (MPa) | 0.82 | 0.86 | 0.99 | 0.85 |
| M 100% (MPa) | 1.94 | 2.14 | 2.47 | 1.87 |
| M 300% (MPa) | 10.91 | 11.47 | 12.92 | 9.94 |
| M 300%/M100% | 5.6 | 5.4 | 5.2 | 5.3 |
| Elongation at rupture (%) | 530.0 | 540.0 | 470.0 | 520.0 |
| Stress at rupture (MPa) | 23.4 | 23.9 | 22.3 | 22.2 |
| Heat Build up (° C.) | +17 | +19 | +16 | +23 |

Example 9

Effect of High Silica Loading on Hardness of NXT Compounds

| Ingredient (phr) | NXT (4-d) | NXT (23) | NXT (24) | NXT (25) | TESPD (3-d) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 90.0 | 95.0 | 100.0 | 80.0 |
| TESPD | | | | | 6.2 |
| NXT Silone | 9.7 | 9.7 | 9.7 | 9.7 | |
| Aromatic Oil | 5.0 | 5.0 | 5.0 | 5.0 | 5.0 |
| Zinc Oxide | 2.5 | 2.5 | 2.5 | 2.5 | 2.5 |
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| N-330 | 3.0 | 3.0 | 3.0 | 3.0 | 3.0 |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 2 | 2 | 2 | 2 | 2 |
| Mixing temperature | 170° C. | 170° C. | 170° C. | 170° C. | 160° C. |

| Compound properties | NXT (4-d) | NXT (23) | NXT (24) | NXT (25) | TESPD (3-d) |
|---|---|---|---|---|---|
| Processing | | | | | |
| Mooney Viscosity | 50 | 54 | 57 | 63 | 64 |
| Scorch time (min) | 13.7 | 15.6 | 15.7 | 13.6 | 12.6 |
| Cure time t90 (min) | 14.4 | 17.3 | 19.2 | 20.0 | 16.9 |
| $M_L$ (dNm) | 5.9 | 6.2 | 6.9 | 6.9 | 8.2 |
| $M_H$ (dNm) | 25.0 | 24.7 | 24.3 | 24.5 | 26.3 |
| Properties in the cured state | | | | | |
| Non-linearity (0-10%) | | | | | |
| $G'_{initial}$ (MPa) | 1.47 | 1.75 | 2.07 | 2.50 | 2.80 |
| $\Delta G'$ (MPa) | 0.33 | 0.50 | 0.72 | 1.03 | 1.35 |
| $G''_{max}$ (MPa) | 0.15 | 0.21 | 0.26 | 0.31 | 0.38 |
| $\tan\delta_{max}$ | 0.12 | 0.15 | 0.17 | 0.17 | 0.20 |
| Wet-Skid Indicator, 10 Hz 1% DSA | | | | | |
| $\tan\delta|0°$ C. | 0.54 | 0.564 | 0.588 | 0.616 | 0.524 |
| Reinforcement | | | | | |
| Hardness (Shore A) | 54 | 56 | 57 | 59 | 58 |
| M25% (MPa) | 0.71 | 0.75 | 0.83 | 0.76 | 0.76 |
| M100% (MPa) | 1.69 | 1.72 | 1.81 | 1.86 | 1.63 |
| M300% (MPa) | 9.83 | 9.74 | 9.76 | 10.14 | 8.62 |
| M300%/M100% | 5.8 | 5.7 | 5.4 | 5.5 | 5.3 |
| Elongation at rupture (%) | 541.0 | 504.0 | 521.0 | 512.0 | 576.0 |
| Stress at rupture (MPa) | 22.4 | 21.1 | 21.7 | 22.0 | 23.0 |

Example 10

Mixing Variations With 100 phr Silica Loaded NXT Compounds

| Ingredient (phr) | NXT (4-d) | NXT (25) | NXT (26) | NXT (27) | TESPD (3-d) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 100.0 | 100.0 | 100.0 | 80.0 |
| TESPD | | | | | 6.2 |
| NXT Silane | 9.7 | 9.7 | 9.7 | 10.9 | |
| Aromatic Oil | 5.0 | 5.0 | 5.0 | 5.0 | 5.0 |
| Zinc Oxide | 2.5 | 2.5 | 2.5 | 2.5 | 2.5 |
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |

-continued

| Ingredient (phr) | NXT (4-d) | NXT (25) | NXT (26) | NXT (27) | TESPD (3-d) |
|---|---|---|---|---|---|
| N-330 | 3.0 | 3.0 | 3.0 | 3.0 | 3.0 |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 2 | 2 | 1 | 1 | 2 |
| Mixing temperature | 170° C. | 170° C. | 170° C. | 170° C. | 160° C. |

| Compound properties | NXT (4-d) | NXT (25) | NXT (26) | NXT (27) | TESPD (3-d) |
|---|---|---|---|---|---|
| Processing | | | | | |
| Mooney Viscosity | 50 | 63 | 62 | 61 | 64 |
| Scorch time (min) | 13.7 | 13.6 | 14.8 | 14.6 | 12.6 |
| Cure time t90 (min) | 14.4 | 20.0 | 19.8 | 18.4 | 16.9 |
| $M_L$ (dNm) | 5.9 | 6.9 | 7.5 | 7.6 | 8.2 |
| $M_H$ (dNm) | 25.0 | 24.5 | 25.0 | 26.0 | 26.3 |
| Properties in the cured state | | | | | |
| Non-linearity (0-10%) | | | | | |
| $G'_{initial}$ (MPa) | 1.47 | 2.50 | 2.10 | 2.00 | 2.80 |
| $\Delta G'$ (MPa) | 0.33 | 1.03 | 0.70 | 0.60 | 1.35 |
| $G''_{max}$ (MPa) | 0.15 | 0.31 | 0.27 | 0.25 | 0.38 |
| $\tan\delta_{max}$ | 0.12 | 0.17 | 0.17 | 0.15 | 0.20 |
| Wet-Skid Indicator, 10 Hz, 1% DSA | | | | | |
| $\tan\delta|0°$ C. | 0.54 | 0.616 | 0.588 | 0.616 | 0.524 |
| Reinforcement | | | | | |
| Hardness (Shore A) | 54 | 59 | 58 | 58 | 58 |
| M 25% (MPa) | 0.71 | 0.76 | 0.71 | 0.76 | 0.76 |
| M 100% (MPa) | 1.69 | 1.86 | 1.83 | 1.96 | 1.63 |
| M 300% (MPa) | 9.83 | 10.14 | 10.44 | 11.41 | 8.62 |
| M 300%/M100% | 5.8 | 5.5 | 5.7 | 5.8 | 5.3 |
| Elongation at rupture(%) | 541.0 | 512.0 | 493.0 | 455.0 | 576.0 |
| Stress at rupture(MPa) | 22.4 | 22.0 | 21.6 | 20.8 | 23.0 |

Example 11

Effect of 105 phr Silica Loading on Hardness of NXT Compounds

| Ingredient (phr) | NXT (4-d) | NXT (28) | NXT (29) | NXT (30) | NXT (31) | TESPD (3-d) |
|---|---|---|---|---|---|---|
| solution SBR | 103.2 | 103.2 | 103.2 | 103.2 | 103.2 | 103.2 |
| Butadiene rubber | 25.0 | 25.0 | 25.0 | 25.0 | 25.0 | 25.0 |
| Silica | 80.0 | 105.0 | 105.0 | 105.0 | 105.0 | 80.0 |
| TESPD | | | | | | 6.2 |
| NXT Silane | 9.7 | 9.7 | 10.2 | 9.7 | 10.2 | |
| Aromatic Oil | 5.0 | 5.0 | 5.0 | 5.0 | 5.0 | 5.0 |
| Zinc Oxide | 2.5 | 2.5 | 2.5 | 2.5 | 2.5 | 2.5 |
| Stearic acid | 1.0 | 1.0 | 1.0 | 1.0 | 1.0 | 1.0 |
| Antiozonant | 2.0 | 2.0 | 2.0 | 2.0 | 2.0 | 2.0 |
| Wax | 1.5 | 1.5 | 1.5 | 1.5 | 1.5 | 1.5 |
| N-330 | 3.0 | 3.0 | 3.0 | 3.0 | 3.0 | 3.0 |
| Sulfur | 1.4 | 1.4 | 1.4 | 1.4 | 1.4 | 1.4 |
| CBS | 1.7 | 1.7 | 1.7 | 1.7 | 1.7 | 1.7 |
| DPG | 2.0 | 2.0 | 2.0 | 2.0 | 2.0 | 2.0 |
| No. of Mixing steps | 2 | 2 | 2 | 1 | 1 | 2 |
| Mixing temperature | 170° C. | 170° C. | 170° C. | 170° C. | 170° C. | 160° C. |

| Compound properties | NXT (4-d) | NXT (28) | NXT (29) | NXT (30) | NXT (31) | TESPD (3-d) |
|---|---|---|---|---|---|---|
| Processing | | | | | | |
| Mooney Viscosity | 50 | 67 | 66.2 | 68 | 68.8 | 64 |
| Scorch time (min) | 13.7 | 12.3 | 14.5 | 14.5 | 14.0 | 12.6 |
| Cure time t90 (min) | 14.4 | 21.1 | 21.4 | 21.0 | 21.0 | 16.9 |
| $M_L$ (dNm) | 5.9 | 7.4 | 7.3 | 8.1 | 8.2 | 8.2 |
| $M_H$ (dNm) | 25.0 | 24.8 | 24.6 | 25.1 | 25.4 | 26.3 |
| Properties in the cured state | | | | | | |
| Non-linearity (0-10%) | | | | | | |
| $G'_{initial}$ (MPa) | 1.47 | 2.20 | 2.08 | 2.08 | 1.97 | 2.80 |
| $\Delta G'$ (MPa) | 0.33 | 0.73 | 0.65 | 0.67 | 0.57 | 1.35 |
| $G''_{max}$ (MPa) | 0.15 | 0.30 | 0.28 | 0.28 | 0.26 | 0.38 |
| $\tan\delta_{max}$ | 0.12 | 0.17 | 0.16 | 0.17 | 0.16 | 0.20 |
| Wet-Skid Indicator, 10 Hz, 1% DSA | | | | | | |
| $\tan\delta|0°$ C. | 0.54 | 0.660 | 0.664 | 0.655 | 0.645 | 0.524 |
| Reinforcement | | | | | | |
| Hardness (Shore A) | 54 | 61 | 61 | 61 | 60 | 58 |
| M 25% (MPa) | 0.71 | 0.85 | 0.83 | 0.8 | 0.81 | 0.76 |
| M 100% (MPa) | 1.69 | 2.04 | 1.98 | 1.94 | 2.01 | 1.63 |
| M 300% (MPa) | 9.83 | 10.64 | 10.34 | 10.43 | 10.84 | 8.62 |
| M 300%/M100% | 5.8 | 5.2 | 5.2 | 5.4 | 5.4 | 5.3 |
| Elongation at rupture(%) | 541.0 | 489.0 | 484.0 | 467.0 | 471.0 | 576.0 |
| Stress at rupture(MPa) | 22.4 | 21.0 | 20.5 | 19.8 | 20.5 | 23.0 |

Example 12

Effect of 110 phr Silica Loading on Hardness of NXT Compounds

| Ingredient (phr) | NXT (4-d) | NXT (32) | NXT (33) | TESPD (3-d) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 110.0 | 110.0 | 80.0 |
| TESPD | | | | 6.2 |
| NXT Silane | 9.7 | 9.7 | 10.7 | |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 3.0 | 3.0 | 3.0 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 2 | 2 | 2 | 2 |
| Mixing temperature | 170° C. | 170° C. | 170° C. | 160° C. |

| Compound properties | NXT (4-d) | NXT (28) | NXT (29) | TESPD (3-d) |
|---|---|---|---|---|
| Processing | | | | |
| Mooney Viscosity | 50 | 70.4 | 70 | 64 |
| Scorch time (min) | 13.7 | 12.6 | 15.0 | 12.6 |
| Cure time t90 (min) | 14.4 | 22.3 | 21.0 | 16.9 |
| $M_L$ (dNm) | 5.9 | 7.7 | 7.6 | 8.2 |
| $M_H$ (dNm) | 25.0 | 24.4 | 25.4 | 26.3 |
| Properties in the cured state | | | | |
| Non-linearity (0-10%) | | | | |
| $G'_{initial}$ (MPa) | 1.47 | 2.44 | 2.15 | 2.80 |
| $\Delta G'$ (MPa) | 0.33 | 0.94 | 0.65 | 1.35 |
| $G''_{max}$ (MPa) | 0.15 | 0.35 | 0.30 | 0.38 |
| $\tan\delta_{max}$ | 0.12 | 0.19 | 0.17 | 0.20 |
| Wet-Skid Indicator, 10 Hz, 1% DSA | | | | |
| $\tan\delta | 0°$ C. | 0.54 | 0.639 | 0.673 | 0.524 |
| Reinforcement | | | | |
| Hardness (Shore A) | 54 | 63 | 63 | 58 |
| M 25% (MPa) | 0.71 | 0.89 | 0.9 | 0.76 |
| M 100% (MPa) | 1.69 | 2.12 | 2.17 | 1.63 |
| M 300% (MPa) | 9.83 | 10.69 | 11.19 | 8.62 |
| M 300%/M100% | 5.8 | 5.0 | 5.2 | 5.3 |
| Elongation at rupture (%) | 541.0 | 477.0 | 459.0 | 576.0 |
| Stress at rupture (MPa) | 22.4 | 20.6 | 19.7 | 23.0 |

Example 13

Effect of CAB-O-SIL®M5 on Hardness of NXT Compounds

| Ingredient (phr) | NXT (4-e) | NXT (34) | NXT (35) | NXT (36) | TESPD (3-e) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 80.0 | 80.0 | 80.0 | 80.0 |
| TESPD | | | | | 6.2 |
| NXT Silane | 9.7 | 9.7 | 9.7 | 9.7 | |
| Aromatic Oil | 5.0 | 5.0 | 5.0 | 5.0 | 5.0 |
| Zinc Oxide | 2.5 | 2.5 | 2.5 | 2.5 | 2.5 |
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| N-330 | 3.0 | 3.0 | 3.0 | 3.0 | 3.0 |
| Fumed Silica M-5 | — | 4.0 | 6.0 | 8.0 | — |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 1 | 1 | 1 | 1 | 2 |
| Mixing temperature | 170° C. | 170° C. | 170° C. | 170° C. | 160° C. |

| Compound properties | NXT (4-e) | NXT (34) | NXT (35) | NXT (36) | TESPD (3-e) |
|---|---|---|---|---|---|
| Processing | | | | | |
| Mooney Viscosity | 54.0 | 56.0 | 57.0 | 60.0 | 63.0 |
| Scorch time (min) | 11.1 | 11.2 | 11.3 | 11.6 | 10.6 |
| Cure time t90 (min) | 13.1 | 14.3 | 14.3 | 15.2 | 15.0 |
| $M_L$ (dNm) | 6.2 | 6.4 | 6.5 | 6.8 | 7.7 |
| $M_H$ (dNm) | 24.8 | 25.2 | 25.3 | 25.9 | 27.5 |
| Properties in the cured state | | | | | |
| Non-linearity (0-10%) | | | | | |
| $G'_{initial}$ (MPa) | 2.04 | 2.49 | 2.34 | 2.21 | 4.70 |
| $\Delta G'$ (MPa) | 0.68 | 1.03 | 0.89 | 0.77 | 2.91 |
| $G''_{max}$ (MPa) | 0.21 | 0.26 | 0.25 | 0.24 | 0.65 |
| $\tan\delta_{max}$ | 0.13 | 0.14 | 0.14 | 0.13 | 0.24 |
| Wet-Skid Indicator, 10 Hz, 1% DSA | | | | | |
| $\tan\delta | 0°$ C. | 0.52 | 0.550 | 0.556 | 0.573 | 0.460 |
| Reinforcement | | | | | |
| Hardness (Shore A) | 52 | 55 | 56 | 57 | 61 |
| M 25% (MPa) | 0.75 | 0.78 | 0.79 | 0.83 | 0.89 |
| M 100% (MPa) | 1.76 | 1.86 | 1.85 | 1.9 | 1.81 |
| M 300% (MPa) | 10.56 | 10.87 | 11.06 | 10.81 | 9.84 |
| M 300%/M100% | 6.0 | 5.8 | 6.0 | 5.7 | 5.4 |
| Elongation at rupture (%) | 504.0 | 521.0 | 502.0 | 516.0 | 557.0 |
| Stress at rupture (MPa) | 23.4 | 23.5 | 22.7 | 23.6 | 24.3 |
| Abrasion loss DIN (mm³) | 128.0 | 122.0 | 121.0 | 124.0 | 126.0 |

Example 14

Effect of CAB-O-SIL®TS-530 on Hardness of NXT Compounds

| Ingredient (phr) | NXT (4-e) | NXT (37) | NXT (38) | NXT (39) | TESPD (3-e) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 80.0 | 80.0 | 80.0 | 80.0 |
| TESPD | | | | | 6.2 |
| NXT Silane | 9.7 | 9.7 | 9.7 | 9.7 | |
| Aromatic Oil | 5.0 | 5.0 | 5.0 | 5.0 | 5.0 |
| Zinc Oxide | 2.5 | 2.5 | 2.5 | 2.5 | 2.5 |

-continued

| Ingredient (phr) | NXT (4-e) | NXT (37) | NXT (38) | NXT (39) | TESPD (3-e) |
|---|---|---|---|---|---|
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| N-330 | 3.0 | 3.0 | 3.0 | 3.0 | 3.0 |
| Fumed Silica TS-530 | — | 3.0 | 6.0 | 8.0 | — |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 1 | 1 | 1 | 1 | 2 |
| Mixing temparature | 170° C. | 170° C. | 170° C. | 170° C. | 160° C. |

| Compound properties | NXT (4-e) | NXT (37) | NXT (38) | NXT (39) | TESPD (3-e) |
|---|---|---|---|---|---|
| Processing | | | | | |
| Mooney Viscosity | 54.0 | 55.0 | 56.0 | 58.0 | 63.0 |
| Scorch time (min) | 11.1 | 11.2 | 12.3 | 11.2 | 10.6 |
| Cure time t90 (min) | 13.1 | 14.0 | 14.4 | 14.1 | 15.0 |
| $M_L$ (dNm) | 6.2 | 6.1 | 6.2 | 6.4 | 7.7 |
| $M_H$ (dNm) | 24.8 | 25.3 | 25.4 | 26.2 | 27.5 |
| Properties in the cured state | | | | | |
| Non-linearity (0-10%) | | | | | |
| $G'_{initial}$ (MPa) | 2.04 | 2.46 | 2.63 | 2.52 | 4.70 |
| $\Delta G'$ (MPa) | 0.68 | 0.99 | 1.19 | 1.11 | 2.91 |
| $G''_{max}$ (MPa) | 0.21 | 0.25 | 0.29 | 0.27 | 0.65 |
| $\tan\delta_{max}$ | 0.13 | 0.13 | 0.16 | 0.14 | 0.24 |
| Wet-Skid Indicator, 10 Hz, 1% DSA | | | | | |
| $\tan\delta|0°$ C. | 0.52 | 0.536 | 0.546 | 0.561 | 0.460 |
| Reinforcement | | | | | |
| Hardness (Shore A) | 52 | 55 | 56 | 57 | 61 |
| M 25% (MPa) | 0.75 | 0.76 | 0.81 | 0.81 | 0.89 |
| M 100% (MPa) | 1.76 | 1.78 | 1.83 | 1.9 | 1.81 |
| M 300% (MPa) | 10.56 | 10.34 | 10.63 | 10.94 | 9.84 |
| M 300%/M100% | 6.0 | 5.8 | 5.8 | 5.8 | 5.4 |
| Elongation at rupture (%) | 504.0 | 553.0 | 545.0 | 532.0 | 557.0 |
| Stress at rupture (MPa) | 23.4 | 24.1 | 24.4 | 23.9 | 24.3 |
| Abrasion loss DIN (mm³) | 128.0 | 126.0 | 127.0 | 124.0 | 126.0 |

Example 15

Effect of CAB-O-SIL®TS-610 on hardness of NXT compounds

| Ingredient (phr) | NXT (4-e) | NXT (40) | NXT (41) | NXT (42) | TESPD (3-e) |
|---|---|---|---|---|---|
| solution SBR | 103.2 | 103.2 | 103.2 | 103.2 | 103.2 |
| Butadiene rubber | 25.0 | 25.0 | 25.0 | 25.0 | 25.0 |
| Silica | 80.0 | 80.0 | 80.0 | 80.0 | 80.0 |
| TESPD | | | | | 6.2 |
| NXT Silane | 9.7 | 9.7 | 9.7 | 9.7 | |
| Aromatic Oil | 5.0 | 5.0 | 5.0 | 5.0 | 5.0 |
| Zinc Oxide | 2.5 | 2.5 | 2.5 | 2.5 | 2.5 |
| Stearic acid | 1.0 | 1.0 | 1.0 | 1.0 | 1.0 |
| Antiozonant | 2.0 | 2.0 | 2.0 | 2.0 | 2.0 |
| Wax | 1.5 | 1.5 | 1.5 | 1.5 | 1.5 |
| N-330 | 3.0 | 3.0 | 3.0 | 3.0 | 3.0 |
| Fumed Silica TS-610 | — | 3.0 | 6.0 | 8.0 | — |
| Sulfur | 1.4 | 1.4 | 1.4 | 1.4 | 1.4 |
| CBS | 1.7 | 1.7 | 1.7 | 1.7 | 1.7 |
| DPG | 2.0 | 2.0 | 2.0 | 2.0 | 2.0 |
| No. of Mixing steps | 1 | 1 | 1 | 1 | 2 |
| Mixing temperature | 170° C. | 170° C. | 170° C. | 170° C. | 160° C. |

| Compound properties | NXT (4-e) | NXT (40) | NXT (41) | NXT (42) | TESPD (3-e) |
|---|---|---|---|---|---|
| Processing | | | | | |
| Mooney Viscosity | 54.0 | 56.0 | 57.0 | 58.0 | 63.0 |
| Scorch time (min) | 11.1 | 10.3 | 10.3 | 10.3 | 10.6 |
| Cure time t90 (min) | 13.1 | 13.1 | 13.3 | 13.3 | 15.0 |
| $M_L$ (dNm) | 6.2 | 6.4 | 6.6 | 6.7 | 7.7 |
| $M_H$ (dNm) | 24.8 | 25.5 | 26.1 | 26.0 | 27.5 |
| Properties in the cured state | | | | | |
| Non-linearity (0-10%) | | | | | |
| $G'_{initial}$ (MPa) | 2.04 | 2.38 | 2.61 | 2.11 | 4.70 |
| $\Delta G'$ (MPa) | 0.68 | 1.03 | 1.16 | 0.71 | 2.91 |
| $G''_{max}$ (MPa) | 0.21 | 0.25 | 0.32 | 0.22 | 0.65 |
| $\tan\delta_{max}$ | 0.13 | 0.14 | 0.17 | 0.14 | 0.24 |
| Wet-Skid Indicator, 10 Hz, 1% DSA | | | | | |
| $\tan\delta|0°$ C. | 0.52 | 0.500 | 0.488 | 0.570 | 0.460 |
| Reinforcement | | | | | |
| Hardness (Shore A) | 52 | 55 | 56 | 56 | 61 |
| M 25% (MPa) | 0.75 | 0.78 | 0.81 | 0.82 | 0.89 |
| M 100% (MPa) | 1.76 | 1.85 | 1.94 | 1.97 | 1.81 |
| M 300% (MPa) | 10.56 | 10.75 | 11.72 | 11.77 | 9.84 |
| M 300%/M100% | 6.0 | 5.8 | 6.0 | 6.0 | 5.4 |
| Elongation at rupture (%) | 504.0 | 525.0 | 504.0 | 469.0 | 557.0 |
| Stress at rupture (MPa) | 23.4 | 24.1 | 23.9 | 22.2 | 24.3 |
| Abrasion loss DIN (mm³) | 128.0 | 113.0 | 121.0 | 124.0 | 126.0 |

Example 16

Effect of CAB-O-SIL®TS-720 Silica on Hardness of NXT Compounds

| Ingredient (phr) | NXT (4-f) | NXT (43) | NXT (44) | TESPD (3-f) |
|---|---|---|---|---|
| solution SBR | 103.2 | 103.2 | 103.2 | 103.2 |
| Butadiene rubber | 25.0 | 25.0 | 25.0 | 25.0 |
| Silica | 80.0 | 80.0 | 80.0 | 80.0 |
| TESPD | | | | 6.2 |
| NXT Silane | 9.7 | 9.7 | 9.7 | |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 3.0 | 3.0 | 3.0 |
| Fumed Silica TS-720 | — | 1.5 | 3.0 | — |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 1 | 1 | 1 | 2 |
| Mixing temperature | 170° C. | 170° C. | 170° C. | 160° C. |

| Compound properties | NXT (4-f) | NXT (43) | NXT (44) | TESPD (3-f) |
|---|---|---|---|---|
| Processing | | | | |
| Mooney Viscosity | 52.4 | 49.6 | 52.4 | 62.3 |
| Scorch time (min) | 12.2 | 12.2 | 12.6 | 10.1 |
| Cure time t90 (min) | 13.5 | 14.1 | 14.1 | 15.5 |
| $M_L$ (dNm) | 6.3 | 6.1 | 6.4 | 7.8 |
| $M_H$ (dNm) | 25.1 | 24.9 | 25.8 | 26.4 |
| Properties in the cured state | | | | |
| Non-linearity (0-10%) | | | | |
| $G'_{initial}$ (MPa) | 1.65 | 2.20 | 1.94 | 3.40 |
| $\Delta G'$ (MPa) | 0.41 | 0.80 | 0.61 | 1.75 |
| $G''_{max}$ (MPa) | 0.16 | 0.25 | 0.21 | 0.48 |
| $\tan\delta_{max}$ | 0.12 | 0.15 | 0.14 | 0.22 |
| Wet-Skid Indicator, 10 Hz, 1% DSA | | | | |
| $\tan\delta|0°$ C. | 0.54 | 0.585 | 0.484 | 0.485 |
| Reinforcement | | | | |
| Hardness (Shore A) | 54 | 55 | 56 | 61 |
| M 25% (MPa) | 0.72 | 0.76 | 0.77 | 0.82 |
| M 100% (MPa) | 1.81 | 1.82 | 1.91 | 1.77 |
| M 300% (MPa) | 11.01 | 10.76 | 10.84 | 9.26 |
| M 300%/M100% | 6.1 | 5.9 | 5.7 | 5.2 |
| Elongation at rupture (%) | 543.0 | 520.0 | 539.0 | 586.0 |
| Stress at rupture (MPa) | 24.8 | 23.3 | 23.9 | 24.1 |
| Abrasion loss DIN ($mm^3$) | 147.0 | 149.0 | 148.0 | 154.0 |

Example 17

Effect of MQ resin (MQ:NXT as 2:1) on NXT compounds

| Ingredient (phr) | TESPD (3-f) | NXT (40) | NXT:MQ (A) 1 | NXT:MQ (A) 2 | NXT:MQ (A) 3 | NXT:MQ (A) 4 | NXT:MQ (A) 5 |
|---|---|---|---|---|---|---|---|
| solution SBR (VSL 5525-1) | 103.2 | 103.2 | 103.2 | 103.2 | 103.2 | 103.2 | 103.2 |
| BR (Budene 1207) | 25.0 | 25.0 | 25.0 | 25.0 | 25.0 | 25.0 | 25.0 |
| Silica(1165 MP) | 80.0 | 80.0 | 80.0 | 80.0 | 80.0 | 80.0 | 80.0 |
| TESPT | | | | | | | |
| TESPD | 6.2 | | | | | | |
| NXT Silane Neat | | 8.2 | 0.0 | 2.2 | 4.2 | 6.2 | 7.2 |
| MQ + NXT Mixture | | | 24.6 | 18.0 | 12.0 | 6.0 | 3.0 |
| Effective MQ loading | | | 16.4 | 12.0 | 8.0 | 4.0 | 2.0 |
| Effective NXT loading | | | 8.2 | 8.2 | 8.2 | 8.2 | 8.2 |
| Aromatic Oil | 5.0 | 5.0 | 5.0 | 5.0 | 5.0 | 5.0 | 5.0 |
| Zinc Oxide | 2.5 | 2.5 | 2.5 | 2.5 | 2.5 | 2.5 | 2.5 |
| Stearic acid | 1.0 | 1.0 | 1.0 | 1.0 | 1.0 | 1.0 | 1.0 |
| Antiozonant | 2.0 | 2.0 | 2.0 | 2.0 | 2.0 | 2.0 | 2.0 |
| Wax | 1.5 | 1.5 | 1.5 | 1.5 | 1.5 | 1.5 | 1.5 |
| N-330 | 3.0 | 3.0 | 3.0 | 3.0 | 3.0 | 3.0 | 3.0 |
| Sulfur | 1.4 | 1.4 | 1.4 | 1.4 | 1.4 | 1.4 | 1.4 |
| CBS | 1.7 | 1.7 | 1.7 | 1.7 | 1.7 | 1.7 | 1.7 |
| DPG | 2.0 | 2.0 | 2.0 | 2.0 | 2.0 | 2.0 | 2.0 |
| No. of Mixing steps | 2 | 1 | 1 | 1 | 1 | 1 | 1 |
| Mixing temperature | 160° C. | 170° C. | 170° C. | 170° C. | 170° C. | 170° C. | 170° C. |

| Compound properties | TESPD (3-f) | NXT (40) | NXT:MQ (A) 1 | NXT:MQ (A) 2 | NXT:MQ (A) 3 | NXT:MQ (A) 4 | NXT:MQ (A) 5 |
|---|---|---|---|---|---|---|---|
| Processing | | | | | | | |
| Mooney Viscosity | 60.0 | 54.0 | 61.0 | 62.0 | 56.0 | 53.0 | 52.0 |
| Scorch time (min) | 7.5 | 10.2 | 14.5 | 14.0 | 13.6 | 13.4 | 12.2 |
| Cure time t90 (min) | 20.0 | 13.1 | 14.3 | 13.5 | 14.0 | 14.1 | 14.1 |
| $M_L$ (dNm) | 7.1 | 6.4 | 6.7 | 6.7 | 6.1 | 6.2 | 6.0 |
| $M_H$ (dNm) | 25.9 | 24.9 | 29.0 | 28.8 | 27.8 | 26.6 | 25.4 |
| Properties in the cured state | | | | | | | |
| Non-linearity (0-10%) | | | | | | | |
| $G'_{initial}$ (MPa) | 4.23 | 2.88 | 3.64 | 3.75 | 2.97 | 3.48 | 4.16 |
| $\Delta G'$ (MPa) | 2.46 | 1.42 | 1.99 | 2.05 | 1.41 | 1.88 | 2.42 |
| $G''_{max}$ (MPa) | 0.55 | 0.32 | 0.41 | 0.43 | 0.31 | 0.36 | 0.48 |
| $\tan\delta_{max}$ | 0.22 | 0.14 | 0.17 | 0.18 | 0.15 | 0.14 | 0.15 |
| Wet-Skid Indicator, 10 Hz, 2% DSA | | | | | | | |
| $\tan\delta|0°$ C. | 0.48 | 0.491 | 0.549 | 0.509 | 0.568 | 0.532 | 0.486 |
| Dynamic Modulus, 10 Hz, 2% DSA | | | | | | | |
| $G'(MPa)|60°$ C. | 2.83 | 1.930 | 2.460 | 2.510 | 2.090 | 2.240 | 2.630 |

-continued

| Compound properties | TESPD (3-f) | NXT (40) | NXT:MQ (A) 1 | NXT:MQ (A) 2 | NXT:MQ (A) 3 | NXT:MQ (A) 4 | NXT:MQ (A) 5 |
|---|---|---|---|---|---|---|---|
| Reinforcement | | | | | | | |
| Hardness (Shore A) | 57 | 53 | 58 | 59 | 58 | 56 | 55 |
| M 25% (MPa) | 1.42 | 1.32 | 1.64 | 1.66 | 1.56 | 1.42 | 1.36 |
| M 100% (MPa) | 2.8 | 2.78 | 3.22 | 3.39 | 3.29 | 3.02 | 2.9 |
| M 300% (MPa) | 12.07 | 12.26 | 10.86 | 11.16 | 11.8 | 12 | 12.24 |
| M 300%/M100% | 4.3 | 4.4 | 3.4 | 3.3 | 3.6 | 4.0 | 4.2 |
| Elongation at rupture (%) | 481.0 | 437.0 | 442.0 | 510.0 | 472.0 | 471.0 | 484.0 |
| Stress at rupture (MPa) | 21.7 | 19.8 | 16.3 | 19.5 | 19.7 | 20.1 | 21.0 |

Example 18

Effecto of MQ resin (MQ:NXT as 1:1) on NXT compounds

| Ingredient (phr) | TESPD (3-f) | NXT (40) | NXT:MQ (B) 1 | NXT:MQ (B) 2 | NXT:MQ (B) 3 | NXT:MQ (B) 4 |
|---|---|---|---|---|---|---|
| solution SBR (VSL 5525-1) | 103.2 | 103.2 | 103.2 | 103.2 | 103.2 | 103.2 |
| BR (Budene 1207) | 25.0 | 25.0 | 25.0 | 25.0 | 25.0 | 25.0 |
| Silica (1165 MP) | 80.0 | 80.0 | 80.0 | 80.0 | 80.0 | 80.0 |
| TESPT | | | | | | |
| TESPD | 6.2 | | | | | |
| NXT Silane Neat | | 8.2 | 0.0 | 2.2 | 4.2 | 6.2 |
| MQ + NXT Mixture | | | 16.4 | 12.0 | 8.0 | 4.0 |
| Effective MQ loading | | | 8.2 | 6.0 | 4.0 | 2.0 |
| Effective NXT loading | | | 8.2 | 8.2 | 8.2 | 8.2 |
| Aromatic Oil | 5.0 | 5.0 | 5.0 | 5.0 | 5.0 | 5.0 |
| Zinc Oxide | 2.5 | 2.5 | 2.5 | 2.5 | 2.5 | 2.5 |
| Stearic acid | 1.0 | 1.0 | 1.0 | 1.0 | 1.0 | 1.0 |
| Antiozonant | 2.0 | 2.0 | 2.0 | 2.0 | 2.0 | 2.0 |
| Wax | 1.5 | 1.5 | 1.5 | 1.5 | 1.5 | 1.5 |
| N-330 | 3.0 | 3.0 | 3.0 | 3.0 | 3.0 | 3.0 |
| Sulfur | 1.4 | 1.4 | 1.4 | 1.4 | 1.4 | 1.4 |
| CBS | 1.7 | 1.7 | 1.7 | 1.7 | 1.7 | 1.7 |
| DPG | 2.0 | 2.0 | 2.0 | 2.0 | 2.0 | 2.0 |
| No. of Mixing steps | 2 | 1 | 1 | 1 | 1 | 1 |
| Mixing temperature | 160° C. | 170° C. | 170° C. | 170° C. | 170° C. | 170° C. |

| Compound properties | TESPD (3-f) | NXT (40) | NXT:MQ (B) 1 | NXT:MQ (B) 2 | NXT:MQ (B) 3 | NXT:MQ (B) 4 |
|---|---|---|---|---|---|---|
| Processing | | | | | | |
| Mooney Viscosity | 60.0 | 54.0 | 56.0 | 55.0 | 53.0 | 51.0 |
| Scorch time (min) | 7.5 | 10.2 | 12.1 | 12.1 | 12.1 | 11.2 |
| Cure time t90 (min) | 20.0 | 13.1 | 13.2 | 13.1 | 13.5 | 13.5 |
| $M_L$ (dNm) | 7.1 | 6.4 | 6.3 | 6.2 | 6.2 | 6.0 |
| $M_H$ (dNm) | 25.9 | 24.9 | 27.8 | 27.1 | 27.1 | 25.5 |
| Properties in the cured state | | | | | | |
| Non-linearity (0-10%) | | | | | | |
| $G'_{initial}$ (MPa) | 4.23 | 2.88 | 3.68 | 3.54 | 3.18 | 3.23 |
| $\Delta G'$ (MPa) | 2.46 | 1.42 | 2.00 | 1.90 | 1.66 | 1.62 |
| $G''_{max}$ (MPa) | 0.55 | 0.32 | 0.40 | 0.39 | 0.33 | 0.34 |
| $\tan\delta_{max}$ | 0.22 | 0.14 | 0.15 | 0.16 | 0.15 | 0.14 |
| Wet-Skid Indicator, 10 Hz, 1% DSA | | | | | | |
| $\tan\delta | 0°$ C. | 0.48 | 0.491 | 0.548 | 0.525 | 0.535 | 0.493 |
| Dynamic Modulus, 10 Hz, 1% DSA | | | | | | |
| $G'(MPa) | 60°$ C. | 2.83 | 1.930 | 2.370 | 2.360 | 2.100 | 2.150 |

-continued

| Compound properties | TESPD (3-f) | NXT (40) | NXT:MQ (B) 1 | NXT:MQ (B) 2 | NXT:MQ (B) 3 | NXT:MQ (B) 4 |
|---|---|---|---|---|---|---|
| Reinforcement | | | | | | |
| Hardness (Shore A) | 57 | 53 | 56 | 56 | 56 | 54 |
| M 25% (MPa) | 1.42 | 1.32 | 1.53 | 1.5 | 1.5 | 1.38 |
| M 100% (MPa) | 2.8 | 2.78 | 3.37 | 3.24 | 3.21 | 2.96 |
| M 300% (MPa) | 12.07 | 12.26 | 12.24 | 12.38 | 12.51 | 12.65 |
| M 300%/M100% | 4.3 | 4.4 | 3.6 | 3.8 | 3.9 | 4.3 |
| Elongation at rupture (%) | 481.0 | 437.0 | 500.0 | 460.0 | 444.0 | 472.0 |
| Stress at rupture (MPa) | 21.7 | 19.8 | 21.1 | 19.6 | 19.4 | 21.6 |

Example 19

Effect of MQ Resin (MQ:NXT as 3:1) on NXT Compounds

| Ingredient (phr) | TESPD (3-f) | NXT (40) | NXT:MQ (C) 1 | NXT:MQ (C) 2 |
|---|---|---|---|---|
| solution SBR (VSL 5525-1) | 103.2 | 103.2 | 103.2 | 103.2 |
| BR (Budene 1207) | 25.0 | 25.0 | 25.0 | 25.0 |
| Silica (1165 MP) | 80.0 | 80.0 | 80.0 | 80.0 |
| TESPT | | | | |
| TESPD | 6.2 | | | |
| NXT Silane Neat | | 8.2 | 3.3 | 5.5 |
| MQ + NXT Mixture | | | 19.9 | 10.7 |
| Effective MQ loading | | | 14.9 | 8.0 |
| Effective NXT loading | | | 8.2 | 8.2 |
| Aromatic Oil | 5.0 | 5.0 | 5.0 | 5.0 |
| Zinc Oxide | 2.5 | 2.5 | 2.5 | 2.5 |
| Stearic acid | 1.0 | 1.0 | 1.0 | 1.0 |
| Antiozonant | 2.0 | 2.0 | 2.0 | 2.0 |
| Wax | 1.5 | 1.5 | 1.5 | 1.5 |
| N-330 | 3.0 | 3.0 | 3.0 | 3.0 |
| Sulfur | 1.4 | 1.4 | 1.4 | 1.4 |
| CBS | 1.7 | 1.7 | 1.7 | 1.7 |
| DPG | 2.0 | 2.0 | 2.0 | 2.0 |
| No. of Mixing steps | 2 | 1 | 1 | 1 |
| Mixing temperature | 160° C. | 170° C. | 170° C. | 170° C. |

| Compound properties | TESPD (3-f) | NXT (40) | NXT:MQ (C) 1 | NXT:MQ (C) 2 |
|---|---|---|---|---|
| Processing | | | | |
| Mooney Viscosity | 60.0 | 54.0 | 56.0 | 56.0 |
| Scorch time (min) | 7.5 | 10.2 | 14.2 | 14.2 |
| Cure time t90 (min) | 20.0 | 13.1 | 14.5 | 15.1 |
| $M_L$ (dNm) | 7.1 | 6.4 | 6.3 | 6.3 |
| $M_H$ (dNm) | 25.9 | 24.9 | 28.1 | 27.0 |
| Properties in the cured state | | | | |
| Non-linearity (0-10%) | | | | |
| $G'_{initial}$ (MPa) | 4.23 | 2.88 | 4.35 | 3.31 |
| $\Delta G'$ (MPa) | 2.46 | 1.42 | 2.62 | 1.67 |
| $G''_{max}$ (MPa) | 0.55 | 0.32 | 0.49 | 0.35 |
| $\tan\delta_{max}$ | 0.22 | 0.14 | 0.17 | 0.16 |
| Wet-Skid Indicator, 10 Hz, 1% DSA | | | | |
| $\tan\delta | 0°$ C. | 0.48 | 0.491 | 0.521 | 0.548 |
| Dynamic Modulus, 10 Hz, 1% DSA | | | | |
| $G'(MPa) | 60°$ C. | 2.83 | 1.930 | 2.650 | 2.310 |
| Reinforcement | | | | |
| Hardness (Shore A) | 57 | 53 | 58 | 57 |
| M 25% (MPa) | 1.42 | 1.32 | 1.59 | 1.47 |
| M 100% (MPa) | 2.8 | 2.78 | 3.19 | 3.01 |
| M 300% (MPa) | 12.07 | 12.26 | 10.75 | 11.66 |
| M 300%/M 100% | 4.3 | 4.4 | 3.4 | 3.9 |
| Elongation at rupture (%) | 481.0 | 437.0 | 484.0 | 494.0 |
| Stress at rupture (MPa) | 21.7 | 19.8 | 17.7 | 20.4 |

Example 20

Comparison of performance of MQ resin, silica and fumed silica on NXT compounds

| Ingredient (phr) | TESPD (3-f) | NXT (High Silica) | NXT (Fumed Silica) | NXT:MQ (A) 4 | NXT:MQ (B) 1 | NXT:MQ (C) 2 |
|---|---|---|---|---|---|---|
| solution SBR (VSL 5525-1) | 103.2 | 103.2 | 103.2 | 103.2 | 103.2 | 103.2 |
| BR (Budene 1207) | 25.0 | 25.0 | 25.0 | 25.0 | 25.0 | 25.0 |
| Silica (1165 MP) | 80.0 | 97.0 | 80.0 | 80.0 | 80.0 | 80.0 |
| Fumed Silica (TS-530) | | | 10.0 | | | |
| TESPD | 6.2 | | | | | |
| NXT Silane Neat | | 8.2 | 8.2 | 6.2 | 0.0 | 5.5 |
| MQ + NXT Mixture | | | | 6.0 | 16.4 | 10.7 |
| Effective MQ loading | | | | 4.0 | 8.2 | 8.0 |
| Effective NXT loading | | | | 8.2 | 8.2 | 8.2 |
| Aromatic Oil | 5.0 | 5.0 | 5.0 | 5.0 | 5.0 | 5.0 |
| Zinc Oxide | 2.5 | 2.5 | 2.5 | 2.5 | 2.5 | 2.5 |
| Stearic acid | 1.0 | 1.0 | 1.0 | 1.0 | 1.0 | 1.0 |
| Antiozonant | 2.0 | 2.0 | 2.0 | 2.0 | 2.0 | 2.0 |
| Wax | 1.5 | 1.5 | 1.5 | 1.5 | 1.5 | 1.5 |

-continued

| Ingredient (phr) | TESPD (3-f) | NXT (High Silica) | NXT (Fumed Silica) | NXT:MQ (A) 4 | NXT:MQ (B) 1 | NXT:MQ (C) 2 |
|---|---|---|---|---|---|---|
| N-330 | 3.0 | 3.0 | 3.0 | 3.0 | 3.0 | 3.0 |
| Sulfur | 1.4 | 1.4 | 1.4 | 1.4 | 1.4 | 1.4 |
| CBS | 1.7 | 1.7 | 1.7 | 1.7 | 1.7 | 1.7 |
| DPG | 2.0 | 2.0 | 2.0 | 2.0 | 2.0 | 2.0 |
| No. of Mixing steps | 2 | 1 | 1 | 1 | 1 | 1 |
| Mixing temperature | 160° C. | 170° C. | 170° C. | 170° C. | 170° C. | 170° C. |

| Compound properties | TESPD (3-f) | NXT (High Silica) | NXT (Fumed Silica) | NXT:MQ (A) 4 | NXT:MQ (B) 1 | NXT:MQ (C) 2 |
|---|---|---|---|---|---|---|
| Processing | | | | | | |
| Mooney Viscosity | 60.0 | 60.0 | 59.0 | 53.0 | 56.0 | 56.0 |
| Scorch time (min) | 7.5 | 11.2 | 12.3 | 13.4 | 12.1 | 14.2 |
| Cure time t90 (min) | 20.0 | 20.3 | 16.1 | 14.1 | 13.2 | 15.1 |
| $M_L$ (dNm) | 7.1 | 7.0 | 6.5 | 6.2 | 6.3 | 6.3 |
| $M_H$ (dNm) | 25.9 | 23.8 | 26.1 | 26.6 | 27.8 | 27.0 |
| Properties in the cured state | | | | | | |
| Non-linearity (0-10%) | | | | | | |
| $G'_{initial}$ (MPa) | 4.23 | 2.67 | 2.95 | 3.48 | 3.68 | 3.31 |
| $\Delta G'$ (MPa) | 2.46 | 1.37 | 1.46 | 1.88 | 2.00 | 1.67 |
| $G''_{max}$ (MPa) | 0.55 | 0.34 | 0.33 | 0.36 | 0.40 | 0.35 |
| $\tan\delta_{max}$ | 0.22 | 0.20 | 0.15 | 0.14 | 0.15 | 0.16 |
| Wet-Skid Indicator, 10 Hz, 2% DSA | | | | | | |
| $\tan\delta|0°$ C. | 0.48 | 0.527 | 0.543 | 0.532 | 0.548 | 0.548 |
| Dynamic Modulus, 10 Hz, 2% DSA | | | | | | |
| $G'(MPa)|60°$ C. | 2.83 | 1.800 | 2.130 | 2.240 | 2.370 | 2.310 |
| Reinforcement | | | | | | |
| Hardness (Share A) | 57 | 56 | 55 | 56 | 56 | 57 |
| M 25% (MPa) | 1.42 | 1.36 | 1.51 | 1.42 | 1.53 | 1.47 |
| M 100% (MPa) | 2.8 | 2.58 | 3.22 | 3.02 | 3.37 | 3.01 |
| M 300% (MPa) | 12.07 | 10.87 | 13.7 | 12 | 12.24 | 11.66 |
| M 300%/M100% | 4.3 | 4.2 | 4.3 | 4.0 | 3.6 | 3.9 |
| Elongation at rupture (%) | 481.0 | 457.0 | 423.0 | 471.0 | 500.0 | 494.0 |
| Stress at rupture (MPa) | 21.7 | 18.7 | 20.1 | 20.1 | 21.1 | 20.4 |

In view of the many changes and modifications that can be made without departing from principles underlying the invention, reference should be made to the appended claims for an understanding of the scope of the protection afforded the invention.

What is claimed is:

1. A method for increasing the hardness of silica/rubber mixtures comprising blending with said mixture at least one silane and a hardness-increasing amount of at least one member selected from the group consisting of thixotropic fumed silica, precipitated silica wherein the total amount of silica is from 80 phr to 110 phr, an MQ resin wherein Q is $SiO_{4/2}$, M is $R^aR^bR^cSiO_{1/2}$, and $R^a, R^b$, and $R^c$ are the same or different functional or non-functional organic groups, a thermoplastic resin selected from the group consisting of high-density polyethylene, ultra high molecular weight polyethylene and low density-polyethylene and a thermosetting resin, wherein the silane is 3-octanoylthio-1-propyltriethoxysilane.

2. The method of claim 1 wherein the at least one member is thixotropic-(hydrophilic and hydrophobic) fumed (pyrogenic) silica.

3. The method of claim 2 wherein the silica/rubber mixture further comprises an inorganic filler.

4. The method of claim 3 wherein the inorganic filler is selected from the group consisting of titanium dioxide, aluminosilicate, alumina, calcium carbonate, carbon fibers, glass fibers, kaolin clay, mica, talc and wollastonite.

5. The method of claim 1 wherein the member is precipitated silica.

6. The method of claim 5 wherein the silica/rubber mixture further comprises an inorganic filler.

7. The method of claim 6 wherein the inorganic filler is selected from the group consisting of titanium dioxide, aluminosilicate, alumina, calcium carbonate, carbon fibers, glass fibers, kaolin clay, mica, talc and wollastonite.

8. A method for increasing the hardness of silica/rubber mixtures comprising blending with said mixture at least one silane and a hardness-increasing amount of an MQ resin wherein Q is $SiO_{4/2}$, M is $R^aR^bR^cSiO_{1/2}$, and $R^a$, $R^b$, and $R^c$ are the same or different functional or non-functional organic groups, wherein the silane is a blocked mercaptosilane, and wherein the silica/rubber mixture optionally includes inorganic filler, and wherein said hardness increasing amount is sufficient to achieve a Shore A hardness of the silica/rubber mixture of from 56 to 63 and which is above the amount necessary to achieve equivalent Shore A hardness of the silica/rubber mixture as compared with the use of an equivalent molar amount of bis-(triethoxysilylpropyldisulfide) as the silane.

9. A method for increasing the hardness of silica/rubber mixtures comprising blending with said mixture at least one silane and a hardness-increasing amount of an MQ resin wherein Q is $SiO_{4/2}$, M is $R^a R^b R^c SiO_{1/2}$, and $R^a$, $R^b$, and $R^c$ are the same or different functional or non-functional organic groups, wherein the silane is 3-octanoylthio-1-propyltriethoxysilane.

10. The method of claim 8 wherein the silica/rubber mixture further comprises an inorganic filler.

11. The method of claim 10 wherein the inorganic filler is selected from the group consisting of titanium dioxide, aluminosilicate, alumina, calcium carbonate, carbon fibers, glass fibers, kaolin clay, mica, talc and wollastonite.

12. The method of claim 1 further including the step of blending carbon black into the mixture.

13. The method of claim 1 wherein the at least one member is the thermoplastic resin.

14. The method of claim 1 wherein the at least one member is a thermosetting resin.

15. An article of manufacture comprising a silica/rubber mixture hardened by blending with said mixture at least one silane and a hardness-increasing amount of at least one member selected from the group consisting of thixotropic fumed silica, precipitated silica wherein the total amount of silica is from 80 phr to 110 phr, an MQ resin wherein Q is $SiO_{4/2}$, M is $R^a R^b R^c SiO_{1/2}$ and $R^a$, $R^b$, and $R^c$ are the same or different functional or non-functional organic groups, a thermoplastic resin selected from the group consisting of high-density polyethylene, ultra high molecular weight polyethylene, low density-polyethylene and a thermosetting resin, wherein the silane is 3-octanoylthio-1-propyltriethoxysilane.

16. An article of manufacture comprising a silica/rubber mixture hardened by blending with said mixture at least one silane and a hardness-increasing amount of an MQ resin wherein Q is $SiO_{4/2}$, M is $R^a R^b R^c SiO_{1/2}$, and $R^a$, $R^b$, and $R^c$ are the same or different functional or non-functional organic groups, wherein the silane is 3-octanoylthio-1-propyltriethoxysilane, and wherein the silica/rubber mixture optionally includes inorganic filler, and wherein said hardness increasing amount is sufficient to achieve a Shore A hardness of the silica/rubber mixture of from 56 to 63 and which is above the amount necessary to achieve equivalent Shore A hardness of the silica/rubber mixture as compared with the use of an equivalent molar amount of bis-(triethoxysilylpropyldisulfide) as the silane.

17. The article of claim 16 wherein said article is a tread portion of a tire.

18. A method for increasing the hardness of silica/rubber mixtures comprising blending with said mixture at least one silane coupling agent and a hardness-increasing amount of silica wherein the total amount of silica is from 80 phr to 110 phr, wherein the silane coupling agent is 3-octanoylthio-1-propyltriethoxysilane,
and wherein said hardness increasing amount is sufficient to achieve a Shore A hardness of from 56 to 63 and which is above the amount necessary to achieve equivalent Shore A hardness of the silica/rubber mixture as compared with the use of an equivalent molar amount of bis-(triethoxysilylpropyldisulfide) as the silane.

19. An article of manufacture comprising a silica/rubber mixture hardened by blending with said mixture at least one silane coupling agent and a hardness-increasing amount of silica wherein the total amount of silica is from 80 phr to 110 phr, wherein the silane coupling agent is 3-octanoylthio-1-propyltriethoxysilane, and wherein the silica/rubber mixture optionally includes inorganic filler,
and wherein said hardness increasing amount is sufficient to achieve a Shore A hardness of from 56 to 63 and which is above the amount necessary to achieve equivalent Shore A hardness of the silica/rubber mixture as compared with the use of an equivalent molar amount of bis-(triethoxysilylpropyldisulfide) as the silane.

20. The method of claim 8 wherein the silica/rubber mixture comprises a rubber selected from the group consisting of solution styrene-butadiene rubber (SSBR), styrene-butadiene rubber (SBR), natural rubber (NR), polybutadiene (BR), ethylene-propylene co- and terpolymers (EP, EPDM), and acrylonitrile-butadiene rubber (NBR), isoprene rubber, 1,3-butadiene, styrene and methyl styrene, natural or synthetic cis-1,4-polyisoprene rubber, emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, vinyl polybutadiene rubber styrene/isoprene copolymers, emulsion polymerization prepared styrene/butadiene/acrylonitrile terpolymer rubber and butadiene/acrylonitrile copolymer rubber.

* * * * *